United States Patent
Koyanagi et al.

(10) Patent No.: US 7,361,450 B2
(45) Date of Patent: Apr. 22, 2008

(54) PHOTOSENSITIVE RESINS, RESIN COMPOSITIONS AND PRODUCTS OF CURING THEREOF

(75) Inventors: Hiroo Koyanagi, Tokyo (JP); Koji Nakayama, Saitama (JP); Chie Umeyama, Saitama (JP); Yoshihiro Kawada, Saitama (JP); Minoru Yokoshima, Ibaraki (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/505,600

(22) PCT Filed: Feb. 25, 2003

(86) PCT No.: PCT/JP03/02081

§ 371 (c)(1),
(2), (4) Date: Aug. 23, 2004

(87) PCT Pub. No.: WO03/072634

PCT Pub. Date: Sep. 4, 2003

(65) Prior Publication Data

US 2005/0153230 A1    Jul. 14, 2005

(30) Foreign Application Priority Data

Feb. 26, 2002  (JP)  .............................. 2002-048865
Oct. 11, 2002  (JP)  .............................. 2002-299047
Oct. 16, 2002  (JP)  .............................. 2002-302101

(51) Int. Cl.
  *G03C 1/73*  (2006.01)
  *G03F 7/027* (2006.01)
  *G03F 7/09*  (2006.01)
  *G03F 7/20*  (2006.01)

(52) U.S. Cl. .............................. 430/287.1; 430/285.1; 430/908; 430/916; 430/9; 430/271.1; 430/321; 525/921

(58) Field of Classification Search ............. 430/270.1, 430/905, 910, 285.1
See application file for complete search history.

(56) References Cited

U.S. PATENT DOCUMENTS 3,923,523 A * 12/1975 Nishikubo et al. ....... 430/285.1
5,194,327 A *  3/1993 Takahashi et al. .......... 428/327

FOREIGN PATENT DOCUMENTS

| JP | 11-337752  |   | 12/1999 |
|----|------------|---|---------|
| JP | 2001-051415|   | 2/2001  |
| JP | 2002-138140|   | 5/2002  |
| JP | 2003-2958  | * | 1/2003  |

OTHER PUBLICATIONS

Partial, machine-assited English translation of Jp 2002-138140 (Koyanagi et al), provided by JPO.*
Chemical Abstract for JP 2003-2958 (Koyanagi et al).*
Derwent Abstract for JP 2003-2958 (Koyanagi et al).*
Machine-assisted English translation of JP 2003-2958 (Koyanagi et al), provided by JPO.*

* cited by examiner

*Primary Examiner*—Sin Lee
(74) *Attorney, Agent, or Firm*—Nields & Lemack

(57) ABSTRACT

A photosensitive resin (A) consisting substantially of a product obtained by reacting a polyester (c) which is a reaction product of a polyol (a) with a tetrabasic acid dianhydride (b) with a compound (d) having an ethylenically unsaturated group and an epoxy group in the molecule; an alkali-soluble photosensitive resin (AA) obtained by reacting the photosensitive resin (A) with a di- or tri-basic acid mono-anhydride (e); photosensitive resin compositions prepared by incorporating the above photosensitive resin with a diluent (XX), a crosslinking agent (B) and/or a photopolymerization initiator (C); products of curing of the compositions; and articles equipped with these products. The resins and resin compositions give cured articles which are suitable for the formation of optical waveguides and excellent in processability, transparency, developability, close adhesion, resistance to soldering heat, and so on.

29 Claims, No Drawings

PHOTOSENSITIVE RESINS, RESIN COMPOSITIONS AND PRODUCTS OF CURING THEREOF

TECHNICAL FIELD

The present invention relates to a photosensitive resin, a photosensitive composition containing the same and a cured product thereof, in more detail, a photosensitive resin useful as a material for a photosensitive optical waveguide for use in photoelectronic substrates, a resin composition that can give cured products excellent in the workability, transparency, developability, adhesiveness, and solder heat resistance, and a cured product thereof.

BACKGROUND ART

At the present time, as a result of rapid advance in the information technology, the information is variously diversified, and not only communication speed but also a volume of information becomes voluminous. Accordingly, the information lines between countries and between cities are being replaced from electrical interconnections to optical interconnections. However, in a majority of information processing terminals, optical signals are transformed to electrical signals to process electronically. Accordingly, in order to improve the processing speed thereof, a length of the interconnection is made as short as possible and a propagation frequency is made as high as possible to cope with this trend. However, with an increase in an amount of image signals to be processed, a volume of information is becoming tremendous. In the electrical processing, since interconnections connecting the respective elements are excessively in proximity to each other, the processing speed can be improved with difficulty owing to various problems such as an influence of mutually generating electric field and magnetic field (cross-talk) and high dielectric constant of a substrate itself.

In order to overcome the problems, in substrates used for a portion of industrial information processing terminals, a photoelectronic substrate in which interconnections between the respective elements that transmit tremendous information are partially substituted for an optical waveguide is adopted. The optical waveguide is a special optical component in which on a surface or immediately below the surface of a substrate, a portion higher in the refractive index than the surroundings is formed to confine light, and thereby light is multiplexed, demultiplexed or switched. The optical waveguides used in a field of optical information processing and optical communication are recently actively studied, in order to achieve higher integration, miniaturization, higher functionality and lower prices. Examples of specific components thereof include optical multiplexing circuits, wavelength filters, optical switches, optical interconnection components and so on.

The optical waveguide is roughly divided into a single-mode optical waveguide and a multi-mode optical waveguide. The former is easy in controlling a guided wave, advantageous in miniaturizing a device, large in an optical power density and suitable in higher speed operation; accordingly, a wide practical application in particular in a field of advanced computer communication has been started. On the other hand, the latter is gathering attention for being advantageous in mass production, convenient in the handling such as connection and, as a result, being easy to lower the cost, in view of strong demand for delivery of high-speed signals with light to offices and general households. However, optical waveguides adopted in these substrates are made of materials such as quartz and fluorinated polyimide; accordingly, in the former case, a flame deposition method that necessitates 1000 degree centigrade or more for formation has to be used, and in the latter case, high temperature treatment at 300 degree centigrade is necessary to imidize fluorinated polyamic acid that is a precursor. That is, these accompany difficulties in the workability and the processability; accordingly, these are expensive for adopting as consumer information processing terminals. As means to overcome the workability and so on, a material that uses a fluorinated epoxy compound is proposed (for instance, JP-A No. 7-159630 (page 2) and JP-A No. 8-327844 (pages 4 and 5)). Furthermore, a material that uses a deuterated compound is proposed (for instance, JP-A NO. 8-327842 (pages 3 and 4)). Still furthermore, a material that uses a siloxane compound is proposed (for instance, JP-A No. 9-124793 (page 3) and JP-A No. 2000-180643 (pages 11 and 12)).

Furthermore, a polymer optical waveguide that can select a convenient manufacturing method with less expensive materials is actively in study. For instance, a method that uses for a semiconductor process such as lithography and etching is applied or a photosensitive polymer or resist is used to form a polymer optical waveguide. In particular, as a method in which a core is formed using a photosensitive polymer and thereby a waveguide is formed, there is a method in which UV light is irradiated through a pattern film, an unexposed portion is removed with solvents, and thereby a waveguide is formed. For instance, a compound that is obtained from an epoxy compound having an asymmetric spiro ring skeleton and (meth)acrylic acid is proposed (for instance, JP-A No. 10-170738 (pages 4 and 5)). While the method is preferably convenient and less expensive, there are problems in that the transparency of the photosensitive polymer is insufficient to cause high absorption loss, and the uniformity and the reproducibility of manufactured core shapes are problematic to cause high scattering loss; that is, a polymer optical waveguide having the performance equivalent in the waveguide characteristics to a quartz optical waveguide has not been manufactured.

In consumer information processing terminals too, in order to improve an information processing speed to cope with a tremendous increase in a volume of information, photoelectronic substrates are demanded to mount. An object of the present invention is, in order to overcome the above problems, to provide a material for optical waveguides that is excellent in the transparency, the adhesiveness, the solder heat resistance, the chemicals resistance and the plating resistance and also excellent in the workability and processability so as to allow conveniently forming an optical waveguide according to the photolithography, more preferably to provide a photosensitive resin that is suitable for applications such as optical waveguides that can be patterned by use of a dilute alkali aqueous solution, are excellent in the workability and can simultaneously satisfy lower cost and higher performance, a resin composition thereof and a cured product thereof.

DISCLOSURE OF THE INVENTION

The present inventors, in order to overcome the problems mentioned above, studied hard and found that a photosensitive resin (A) of the present invention can become a material for optical waveguides that is excellent in the transparency, the adhesiveness, the solder heat resistance, the chemicals resistance and the plating resistance and also excellent in the workability and processability that allow conveniently forming an optical waveguide according to the photolithography, in particular, found that a resin composition mainly containing carboxyl group-containing (meth)acrylate oligomer (A') and a diluent (B) or a resin (AA) containing a reaction product obtained by further reacting a mono-anhydride (e) of dibasic acid or tri-basic acid to a photosensitive resin (A) can be a little freely controlled in the refractive index when it is altered in its composition, can be patterned by removing an unexposed area with a dilute alkali aqueous solution (an organic solvent is used when it is not alkali-soluble), and is excellent in the light transparency and the flatness when it is applied to a core portion and a clad layer of an optical waveguide, and came to completion of the invention.

That is, the present invention intends to provide

1. A photosensitive resin (A) characterized by being substantially comprising a reaction product between a polyester compound (c) and a compound (d) having an ethylenic unsaturated group and an epoxy group in a molecule, wherein the polyester compound (c) is a reaction product between a polyol compound (a) and tetra-basic acid dianhydride (b).
2. The photosensitive resin (A) according to the item 1, wherein the polyol compound (a) is a diol compound (a'),
3. The photosensitive resin (A) according to the item 1, wherein the polyester compound (c) is a carboxyl group-containing polyester compound (c'), the compound (d) that has an ethylenic unsaturated group and an epoxy group in a molecule is a compound (d') having a (meth)acryloyl group and an epoxy group in a molecule, and an obtained reaction product is carboxyl group-containing (meth)acrylate oligomer (A'),
4. The photosensitive resin (A) according to the item 2, wherein the diol compound (a') is a compound having an alicyclic structure,
5. The photosensitive resin (A) according to the item 2, wherein the diol compound (a') is a diol compound selected from a group consisting of 3,9-bis(2-hydroxy-1,1-dimethyletyl)-2,4,8,10-tetraoxaspiro[5.5]undecane, 2-(2-hydroxy-1,1-dimethylethyl)-5-ethyl-5-hydroxymethyl-1,3-dioxane, tricyclodecanedimethanol and cyclohexanedimethanol,
6. The photosensitive resin (A) according to any one of the items 1 through 5, wherein the tetra-basic acid dianhydride (b) is a tetra-basic acid dianhydride selected from a group of consisting pyromellitic anhydride, ethylene glycol-bis(anhydrotrimellitate), glycerin-bis(anhydrotrimellitate)monoacetate, 1,2,3,4,-butanetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, 3,3',4,4'-diphenylethertetracarboxylic dianhydride, 2,2-bis(3,4-anhydrodicarboxyphenyl)propane, 2,2-bis(3,4-anhydrodicarboxyphenyl)hexafluoropropane, 5-(2,5-dioxotetrahydro-3-furanyl)-3-methylcyclohexene-1,2-dicarboxylic anhydride and 3a,4,5,9b-tetrahydro-5-(tetrahydro-2,5-dioxo-3-furanyl)-naphtho[1,2-c]furan-1,3-dione,
7. The photosensitive resin (A) according to any one of the items 1 through 6, wherein the compound (d) having an ethylenic unsaturated group and an epoxy group in a molecule is glycidyl (meth)acrylate,
8. The photosensitive resin (A) according to the item 1, wherein the diol compound (a') is a diol compound selected from a group consisting of 3,9-bis(2-hydroxy-1,1-dimethylethyl)-2,4,8,10-tetraoxaspiro[5.5]undecane, 2-(2-hydroxy-1,1-dimethyethyl)-5-ethyl-5-hydroxymethyl-1,3-dioxane, tricyclodecanedimethanol and cyclohexanedimethanol, the tetra-basic acid dianhydride (b) is pyromellitic anhydride, and the (d) component is glycidyl (meth)acrylate,
9. The photosensitive resin (A) according to any one of the items 1 through 8, wherein an acid value of a solid content contained in the photosensitive resin (A) is 120 mg·KOH/g or less,
10. A resin composition characterized by including the photosensitive resin (A) according to any one of the items 1 through 9 and a diluent (XX),
11. The resin composition according to the item 10, including a carboxyl group-containing (meth)acrylate oligomer (A') and a diluent (XX) wherein said oligomer (A') is a reaction product between a carboxyl group-containing polyester compound (c') that is a reaction product of tetra-basic acid dianhydride (b) and a polyol compound (a) and a compound (d') having a (meth)acryloyl group and an epoxy group in a molecule,
12. The resin composition according to the item 11 characterized in that the resin composition is one for use in an optical waveguide,
13. The resin composition according to the item 10 or 12 characterized by including a photopolymerization initiator (C),
14. The resin composition according to any one of the items 10 through 13, comprising an ethylenic unsaturated group-containing compound (D) other than the photosensitive resin (A) according to the item 1 and the diluent (XX) component according to the item 10,
15. A cured product of the resin composition according to any one of the items 10 through 14,
16. A photosensitive resin composition characterized by containing the photosensitive resin (A) according to any one of the items 1 through 9, a crosslinking agent (B) and a photopolymerization initiator (C),
17. The photosensitive resin composition according to the item 16, wherein the crosslinking agent (B) is a poly(meth)acrylate of polyhydric alcohol that has substantially 3 to 20 carbon atoms and may contain an ether bond or a reaction product between a diglycol that has 6 to 25 carbon atoms and contains a 4- to 6-membered aliphatic ring that may contain an oxygen atom and (meth)acrylic acid,
18. The photosensitive resin composition according to the item 17, wherein the reaction product is a reaction product between 2-(2-hydroxy-1,1-dimethylethyl)-5-ethyl-5-hydroxymethyl-1,3-dioxane and acrylic acid,
19. A cured product of the photosensitive resin composition according to any one of the items 16 through 18,
20. A base material, comprising a layer of the cured product according to the item 19,
21. An optical waveguide including a layer of the cured product according to the item 20,
22. An article having the base material according to the item 20 or the optical waveguide according to the item 21,
23. An alkali-soluble photosensitive resin (AA) characterized by including a reaction product obtained by allowing further reacting dibasic acid or tri-basic acid monoanhydride (e) to a photosensitive resin (A) substantially made of a reaction product between a polyester compound (c) that is a reaction product between a polyol compound (a) and tetra-basic acid dianhydride (b) and a compound (d) having an ethylenic unsaturated group and an epoxy group in a molecule,
24. The resin (AA) according to the item 23 characterized by containing a reaction product between an ethylenic unsaturated group-containing polyester compound obtained from a polyester compound (c) and a compound (d) having an ethylenic unsaturated group and an epoxy group in a molecule, wherein said polyester compound (c) is obtained from a diol compound (a') and tetra-basic acid dianhydride (b) and di- or tri-basic acid monoanhydride (e), 25. The resin (AA) according to the item 24, wherein the diol compound (a') is a compound having a alicyclic skeleton, 26. The resin (AA) according to the item 24, wherein the diol compound (a') is a diol compound selected from a group consisting of 3,9-bis(2-hydroxy-1,1-dimethylethyl)-2,4,8,10-tetraoxaspiro[5.5]undecane, 2-(2-hydroxy -1,1-dimethylethyl)-5-ethyl-5-hydroxymethyl-1,3-dioxane, tricyclodecanedimethanol and cyclohexanedimethanol, 27. The resin (AA) according to any one of the items 24 through 26, wherein the tetra-basic acid dianhydride (b) is a tetra-basic acid dianhydride selected from a group consisting of pyromellitic anhydride, ethylene glycol-bis (anhydrotrimellitate), glycerin-bis(anhydrotrimellitate) monoacetate, 1,2,3,4,-butanetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, 3,3',4,4'-diphenylethertetracarboxylic dianhydride, 2,2-bis(3,4-anhydrodicarboxyphenyl)propane, 2,2-bis(3,4-anhydrodicarboxyphenyl)hexafluoropropane, 5-(2,5-dioxotetrahydro-3-furanyl)-3-methylcyclohexene-1,2-dicarboxylic anhydride and 3a,4,5,9b-tetrahydro-5-(tetrahydro-2,5-dioxo-3-furanyl)-naphtho[1,2-c]furan-1,3-dione, 28. The resin (AA) according to any one of the items 24 through 27, wherein the compound (d) having an ethylenic unsaturated group and an epoxy group in a molecule is glycidyl (meth)acrylate, 29. The resin (AA) according to any one of the items 24 through 28, wherein the di- or tri-basic acid monoanhydride (e) is di- or tri-carboxylic monoanhydride, 30. The resin (AA) according to any one of the items 24 through 28, wherein the di- or tri-basic monoanhydride (e) is di- or tri-basic acid monoanhydride selected from tetrahydrophthalic anhydride, hexahydrophthalic anhydride, succinic anhydride, maleic anhydride and trimellitic anhydride, 31. The resin (AA) according to any one of the items 24 through 30, wherein an acid value of a solid content contained in the resin (AA) is in the range of 50 to 150 mg·KOH/g, 32. A photosensitive resin composition characterized by including the resin (AA) according to any one of the items 24 through 31, a crosslinking agent (B) and a photopolymerization initiator (C), 33. A cured product of the photosensitive resin composition according to the item 32, 34. A base material having a layer of the cured product according to the item 33, 35. An optical waveguide having a layer of the cured product according to the item 33, and 36. An article having the base material according to the item 34 or the optical waveguide according to the item 35.

BEST MODE FOR CARRYING OUT THE INVENTION

Hereinafter, the present invention will be detailed. Hereinafter, (meth)acryl means methacryl or acryl, and (meth) acrylate means methacrylate or acrylate. Furthermore, "part" and "%" are, unless otherwise noted, based on mass.

An acid value of solid content used in the invention means a value measured by a method based on JIS K-0070.

The photosensitive resin (A) according to the invention is characterized by being a reaction product of a polyester compound that is a reaction product between a polyol compound (a), preferably a diol compound (a') and tetrabasic acid dianhydride (b) and a compound (d) having an ethylenic unsaturated group and an epoxy group in a molecule that functions as a photosensitive group. Furthermore, the resin (AA) according to the invention is characterized by being a reaction product of the photosensitive resin (A) and di- or tri-basic monoanhydride.

As the polyol compound (a) that is used to manufacture the photosensitive resin (A) according to the invention, as far as the compound contains two or more alcoholic hydroxy groups, there is no particular restriction. For instance, alkyl polyol, cyclo ring-containing polyol, dioxane ring-containing polyol, polyester polyol, polyether polyol, acryl polyol, polybutadiene polyol, silicon polyol and epoxy (meth)acrylate having two or more alcoholic hydroxy groups can be cited. Among the polyol compounds (a), normally, diol compounds (a') are preferable.

The alkylpolyol includes, 1,4-butanediol, 1,6-hexanediol, 1,8-octanediol, neopentyl glycol, trimethylolpropane, and pentaerythritol.

The cyclo ring-containing polyol includes, cyclohexane dimethanol, hydrogenated bisphenol A, hydrogenated bisphenol F, hydrogenated biphenol, tricyclodecanedimethanol and compounds represented by a formula below.

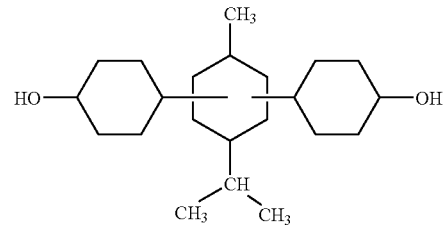

The dioxane ring-containing polyol includes 5-ethyl (or 5-methyl)-2-(2-hydroxy-1,1-dimethylethyl)-5-hydroxymethyl-1,3-dioxane and 3,9-bis(2-hydroxy-1,1-dimethylethyl)-2,4,8,10-tetraoxaspiro[5.5]undecane (spiroglycol) represented by the following formula.

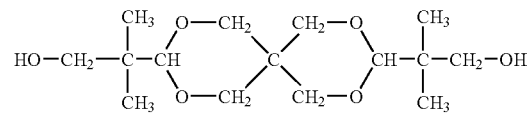

The polyester polyol includes condensed polyester polyol, addition polymerized polyester polyol, and polycarbonate polyol.

The condensed polyester polyol includes ones that are obtained according to a condensation reaction between a diol compound such as ethylene glycol, propylene glycol, diethylene glycol, 1,4-butanediol, neopentyl glycol, 1,6-hexanediol, 3-methyl-1,5-pentanediol, 1,9-nonanediol, 1,6-hexane dimethanol, dimer acid diol or polyethylene glycol and organic polybasic acid such as adipic acid, isophthalic acid, terephthalic acid or sebacic acid. A molecular weight thereof is preferably in the range of 100 to 100,000.

As the addition polymerized polyester polyol, polycaprolactone can be cited and a molecular weight thereof is preferably in the range of 100 to 100,000. Polycarbonate polyol can be synthesized by direct phosgenation of polyol or an ester exchange method due to diphenyl carbonate and a molecular weight thereof is preferably in the range of 100 to 100,000.

As the polyester polyol, PEG (polyethylene glycol) origin, PPG (polypropylene glycol) origin and PTG origin polyol can be cited. The PEG origin polyols are ones that are obtained by addition polymerization of ethylene oxides using a compound having an active hydrogen as a reaction initiator, and preferably a molecular weight thereof is in the range of 100 to 100,000. The PPG origin polyols are ones that are obtained by addition polymerization of propylene oxides using a compound having an active hydrogen as a reaction initiator, and preferably a molecular weight thereof is in the range of 100 to 100,000. The PTG origin polyols are ones that are obtained by cation polymerization of tetrahydrofuran, and preferably a molecular weight thereof is in the range of 100 to 100,000. Polyether polyols other than the abovementioned polyester polyols includes ethylene oxide adducts or propylene oxide adducts of bisphenol and a molecular weight thereof is preferably in the range of 100 to 100,000.

The epoxy (meth)acrylate having two or more alcoholic hydroxy groups includes a reaction product of epoxy a resin having two or more glycidyl groups and (meth)acrylic acid. Preferable epoxy (meth)acrylate includes bisphenol A epoxy (meth)acrylate, bisphenol F epoxy (meth)acrylate, di(meth)acrylic ester of biphenol diglycidyl ether, and di(meth)acrylic ester of hydrogenated bisphenol A diglycidyl.

The other polyol includes (meth)acryl polyol that is a copolymer of hydroxyl group-containing (meth)acrylic ester and other (meth)acrylic ester and polybutadiene polyol that is a homo- or co-polymer that is a copolymer of butadiene and has a hydroxyl group at a termina and a molecular weight thereof is preferably in the range of 100 to 100,000. These polyol compounds may be used singularly or in combinations of two or more kinds.

Among the above-mentioned polyol compounds, cyclo ring-containing polyols are preferable.

From viewpoints of the transparency and the heat resistance of a cured product, compounds having an alicyclic skeleton in a skeleton are more preferable. Among these, diol compounds selected from a group consisting of 3,9-bis(2-hydroxy-1,1-dimethylethyl)-2,4,8,10-tetraoxaspiro[5.5]undecane, 2-(2-hydroxy-1,1-dimethylethyl)-5-ethyl-5-hydroxymethyl-1,3-dioxane, tricyclodecanedimethanol (for instance, tricyclodecane-1,5-dimethanol, tricyclodecane-1,6-dimethanol, tricyclodecane-2,5-dimetanol and so on) and cyclohexanedimethanols (for instance, cyclohexane-1,4-dimethanol, cyclohexane-1,3-dimethanol and so on) are preferable because of their excellent adhesiveness to a subtrate.

The tetra-basic acid dianhydride (b) that is used for manufacturing the photosensitive resin (A) of the invention, as far as it is a dianhydride of tetracarboxylic acid of which carboxyl groups have a dianhydride structure, is not particularly restricted. Dianhydrides obtained by dehydrating two water molecules from tetra-basic acids such as pyromelittic acid, 3,3',4,4'-benzophenone tetracarboxylic acid; biphenyl tetracarboxylic acids such as 3,3',4,4'-biphenyl tetracarboxylic acid, 2,3',3,4'-biphenyl tetracarboxylic acid, and 2,3',4,4'-biphenyl tetracarboxylic acid; 3,3',4,4'-diphenyl ether tetracarboxylic acid; naphthalene tetracarboxylic acids such as 1,2,5,6-naphthalene tetracarboxylic acid, 2,3,6,7-naphthalene tetracarboxylic acid and 1,4,5,8-naphthalene tetracarboxylic acid; 3,3'4,4'-diphenylsulfone tetracarboxylic acid and m-terphenyl-3,3',4,4'-tetracarboxylic acid; phenylpropane tetracarboxylic acids such as 1,1,1,3,3,3-hexafluoro-2,2-bis(2,3- or 3,4-dicarboxyphenyl)propane, 2,2-bis(2,3- or 3,4-dicarboxyphenyl)propane, 2,2-bis[4'-(2,3- or 3,4-dicarboxyphenoxy)phenyl]propane, and 1,1,1,3,3,3-hexafluoro-2,2-bis(4'-(2,3- or 3,4-dicarboxyphenoxy)phenyl)propane; aromatic tetracarboxylic acids such as 2,3,6,7-anthracene tetracarboxylic acid, 1,2,7,8-phenanthlene tetracarboxylic acid, 4,4'-bis(2,3-dicarboxyphenoxy)diphenyl methane, ethylene glycol bis(anhydrotrimellitate), and 1,3,3a,4,5,9b-hexahydro-5-(tetra-hydro-2,5-dioxo-3-furanyl)naphtho[1,2c]furane-1,3-dione (brand name: Ricacid TDA-100, manufactured by New Japan Chemical Co., Ltd.); and aliphatic tetracarboxylic acid such as cyclobutanetetracarboxylic acid, butanetetracarboxylic acid (brand name: Ricacid BT-100, manufactured by New Japan Chemical Co., Ltd.), 2,3,5,6-pyridine tetracarboxylic acid, and 3,4,9,10-pesolene tetracarboxylic acid; and silicon-containing aromatic tetracarboxylic dianhydride represented by a general formula (1) below

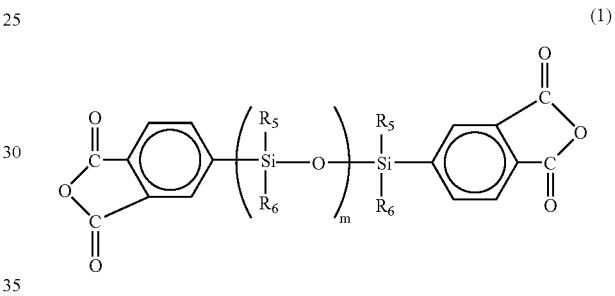

(1)

(in the formula, $R_5$ and $R_6$ represent a monovalent hydrocarbon group, preferably a hydrocarbon group having 1 to 10 carbon atoms, more preferably an alkyl group having 1 to 5 carbon atoms or an aryl group (phenyl group, tolyl group, naphthyl group) having 6 to 10 carbon atoms and may be the same or different from each other, m being an integer of 1 or more) can be cited. These may be used singularly or in combinations of two or more kinds. Among the tetra-basic acid dianhydrides, aliphatic tetracarboxylic dianhydrides are preferable.

From a viewpoint that a cured product excellent in the transparency and the heat resistance can be obtained, one kind or two or more kinds of tetra-basic acid dianhydrides selected from a group consisting of pyromellitic anhydride, ethylene glycol-bis(anhydrotrimellitate), glycerin-bis(anhydrotrimellitate)monoacetate, 1,2,3,4,-butanetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, 3,3',4,4'-diphenylethertetracarboxylic dianhydride, 2,2-bis(3,4-anhydrodicarboxyphenyl)propane, 2,2-bis(3,4-anhydrodicarboxyphenyl)hexafluoropropane, 5-(2,5-dioxotetrahydro-3-furanyl)-3-methylcyclohexene-1,2-dicarboxylic anhydride and 3a,4,5,9b-tetrahydro-5-(tetrahydro-2,5-dioxo-3-furanyl)-naphtho[1,2-c]furane-1,3-dione can be preferably used.

The compound (d) that is used to manufacture the photosensitive resin (A) of the invention and has an ethylenic unsaturated group and an epoxy group in a molecule is not particularly restricted; however, a compound that has one (meth)acryloyl group and one epoxy group in one molecule is preferable.

Specific examples of the compound that has one (meth) acryloyl group and one epoxy group in one molecule include glycidyl (meth)acrylate

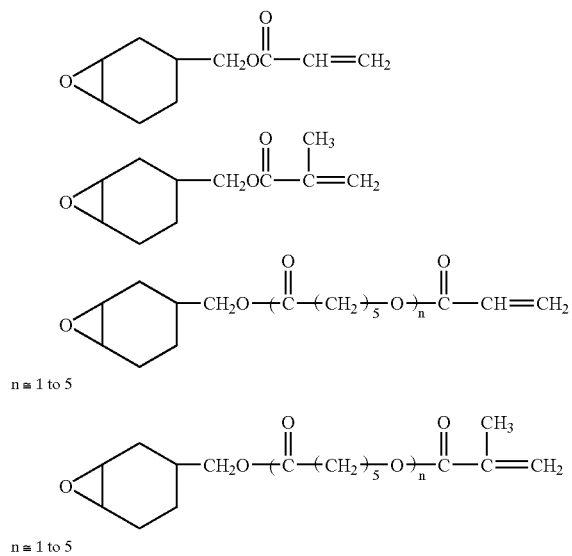

and so on. From a viewpoint of the photosensitivity, glycidyl (meth)acrylate is preferable.

The photosensitive resin (A) of the invention can be obtained in such a manner that a diol compound (a) and tetra-basic acid dianhydride (b) are caused to react (hereinafter referred to as "first reaction") to form a polyester compound (c), thereafter, a generated carboxyl group react (hereinafter referred to as "second reaction") with a compound (d) that has an ethylenic unsaturated group and an epoxy group in one molecule.

The first reaction can be carried out without a solvent or with only one or combinations of organic solvents that do not have an alcoholic hydroxy group and are listed below.

Specific examples of solvents include such as ketones such as lower aliphatic ketones such as acetone, ethyl methyl ketone, methyl isobutyl ketone and cyclohexanone; aromatic hydrocarbons such as benzene, toluene, xylene, and tetramethyl benzene; ethers such as cyclic ether such as 1,4-dioxane and tetrahydrofuran, glycol di-lower alkylethers such as ethylene glycol dimethylether, ethylene glycol diethylether, dipropylene glycol dimethylether, dipropylene glycol diethylether, triethylene glycol dimethylether and triethylene glycol diethylether, preferably mono- or poly-lower alkylene glycol di-lower alkylether; esters such as acetate ester such as ethyl acetate and butyl acetate, preferably lower alkyl acetate esters, mono- or poly-lower alkylene glycol mono-lower alkylether acetate such as methyl cellosolve acetate, ethyl cellosolve acetate, butyl cellosolve acetate, carbitol acetate, propylene glycol monomethylether acetate, propylene glycol monoethylether acetate and dipropylene glycol monomethylether acetate, di-lower alkylesters of lower aliphatic dicarboxylic acid such as dialkyl glutarate, dialkyl succinate and dialkyl adipate, and cyclic esters such as γ-butylolactone; other solvents such as petroleum origin solvents such as petroleum ether, petroleum naphtha, hydrogenated petroleum naphtha and solvent naphtha, and crosslinking agents (B) described later. In the case of a solvent, a crosslinking agent (B) being used in the first reaction, a concentration thereof is preferably more than 0 and up to 70% by mass.

A charge ratio of raw materials in the first reaction is preferably 50 to 100 equivalent percent of tetra-basic acid dianhydride (b) relative to one equivalent weight of the diol compound (a). When the ratio exceeds 100 equivalent weight percent, end groups of a polyester compound formed in the middle become anhydride, and gelation may be caused in the second reaction or the storage stability may be deteriorated when a composition is prepared therefrom. On the other hand, when the ratio is less than 50 equivalent weight percent, since a molecular weight of a polyester compound formed in the middle becomes lower, in some cases, the photosensitivity may be deteriorated and unreacted diol compounds may remain.

Furthermore, on the origin of one equivalent weight of tetra-basic acid dianhydride (b), an amount of the (a) component used is an amount that, relative to one equivalent of an acid anhydride group in the (b) component, hydroxy groups in the (a) component is more than one equivalent and 2.0 equivalent weight or less or 0.5 equivalent or more and less than 1 equivalent, preferably in the range of 1.1 to 2.0 equivalent.

The reaction can be carried out without a catalyst or in the presence of a basic catalyst. In the case of the reaction being carried out without a catalyst, a reaction temperature becomes a little higher than that in the case of the reaction in the presence of the catalyst. In the case of a reaction at a low temperature being necessary, the reaction is preferably carried out in the presence of the basic catalyst. The reaction temperature, though different depending on raw materials, presence of the catalyst, an amount of the catalyst used and so on, is normally in the range of about 40 to 160 degree centigrade, preferably 80 degree centigrade or more, more preferably 100 degree centigrade or more and 150 degree centigrade or less, more preferably 140 degree centigrade or less. Furthermore, a reaction time, though different depending on raw materials, presence of the catalyst, the reaction temperature and so on, is in the range of substantially 1 to 60 hr. When the reaction temperature is low, in some cases, such a long time as 40 to 50 hr is required; however, usually, about 1 to 10 hr is preferable.

In the case of the reaction being carried out in the presence of the basic catalyst, as a result of the formation of a charge transfer complex between a basic catalyst and dianhydride (b) of tetrabasic acid, coloration may be caused; accordingly, an amount of catalyst is preferably 1000 ppm or less of an amount of a reaction liquid (weight). The basic catalyst include for example, trimethylamine, trimethylamine, monomethanolamine, dimethanolamine, tetramethylammonium, dimethylaniline, diethylaniline, dimethylaminopyridine, trimethylphospine and triphenylphosphine.

The second reaction is a process where after the first reaction came to completion, the (d) component is added to the reaction solution, and thereby a carboxyl group of a polyester compound manufactured of the first reaction and an epoxy group of the compound (d) having an ethylenic unsaturated group and an epoxy group in a molecule are caused to react.

The photosensitive resin (A) of the invention, depending on a charge amount of the compound (d) that is caused to react in the second reaction and has an ethylenic unsaturated group and an epoxy group in a molecule, can cope with any one of an organic solvent development type and an alkali aqueous solution development type. In the case of, for instance, the alkali aqueous solution development type being formed, an amount of the (d) component used is an amount where an epoxy group in the (d) component, relative to one equivalent of carboxyl group in the (c) component, is 0.05 to 0.8 equivalent and preferably 0.5 to 0.6 equivalent.

The maximum charge amount of the compound (d) having an ethylenic unsaturated group and an epoxy group in a molecule can be determined of a molecular weight of the compound (d), a weight of the polyester compound obtained at the first reaction and an acid value of solid content thereof. That is, when a molecular weight of the compound (d) is taken mw, a weight of the polyester compound obtained at the first reaction is taken m (g) and an acid value of solid content is taken AV (mg·KOH/g), the maximum charge amount can be expressed with an equation of (AV×m×mw)/(56110) (56110 is obtained by multiplying 1000 to a molecular weight of KOH). In the case of the maximum amount being charged, the solid acid value of the obtained photosensitive resin (A) theoretically becomes 0 mg·KOH/g, and it can be supplied as an organic solvent development type photosensitive resin (A).

Furthermore, in the case of an amount smaller than the maximum charge amount obtained from the above calculation formula being charged, the obtained photosensitive resin (A) becomes a material having the acid value; accordingly, it can be supplied as an alkali aqueous solution development type photosensitive resin (A). At this time, an amount that makes the acid value of solid content 120 mg·KOH/g or less is preferably charged, and an amount that makes it in the range of 0 to 120 mg·KOH/g is more preferably charged. In the case of the solid acid value of solid content exceeding 120 mg·KOH/g, an amount of introducing the compound (d) having an ethylenic unsaturated group and an epoxy group in a molecule that functions as a photosensitive group becomes less; accordingly, lowering of the sensitivity and the deterioration of the heat resistance due to the lowering of the crosslinking density are unfavorably liable to occur.

At the time of the second reaction, in order to accelerate the reaction, a catalyst is preferably used. An amount of the catalyst used is preferably, in the range of 0.1 to 10% by weight and particularly preferably in the range of 0.2 to 3% by weight relative to a total amount of the (c) component and the (d) component. Furthermore, an amount of the catalyst may be 500 to 10000 ppm of a mass of the reaction solution. The catalyst may have been added at the reaction of the (a) component and the (b) component.

A reaction temperature is normally 60 to 150 degree centigrade and preferably 80 to 120 degree centigrade. Furthermore, a reaction time is preferably 5 to 60 hr. Specific example of catalysts that can be used, include such as triethylamine, benzylmethylamine, triethylammonium chloride, benzyltrimethylammonium bromide, benzyltrimethylammonium iodide, triphenylphosphine, triphenylstibine, methyltriphenylstibine, chromium octanate and zirconium octanate.

Still furthermore, in order to inhibit the ethylenic unsaturated group of the compound (d) having an ethylenic unsaturated group and an epoxy group from thermally polymerizing during the reaction, a thermal polymerization inhibitor is preferably added. Specific examples of thermal polymerization inhibitors include methoquinone, hydroquinone, methylhydroquinone, hydroquinone monomethyl ether, tert-butyl catechol, 2,6-di-tert-butyl-p-cresol and phenothiazine and so on. However, from a viewpoint that the coloration can be suppressed as far as possible from occurring, hydroquinone monomethyl ether and 2,6-di-tert-butyl-p-cresol are preferable. An amount thereof used is preferably in the range of 0.01 to 1% by weight and particularly preferably in the range of 0.05 to 0.5% by weight relative to a total weight of the (c) component and the (d) component. Furthermore, the thermal polymerization inhibitor may be used in the range of 100 to 10000 ppm of a weight of a reaction solution.

The photosensitive resin (A) of the invention can contain one or two or more selected from a group consisting of a diluent (XX), a crosslinking agent (B) and a photo-polymerization initiator (C). A photosensitive resin composition containing these, other than being useful as an optical waveguide that interconnects between optical components, can be used also as an insulating material between layers of an electronic component, a solder resist for a printed circuit board, a resist material such as a cover lay, a color filter, printing ink, a sealing agent, paint, a coating agent and an adhesive.

Preferable one of a photosensitive resin composition containing a diluent (XX) includes, for instance, a resin composition (hereinafter referred to as "resin composition 1") that includes carboxyl group-containing (meth)acrylate oligomer (A') and a diluent (XX) wherein (meth)acrylate oligomer (A') is a reaction product of a carboxyl group-containing polyester compound (C') and a compound (d') having one (meth)acryloyl group and one epoxy group in one molecule wherein said polyester compound (c') is a reaction product of tera-basic acid dianhydride (b) and a polyol compound (a).

The diluent (XX) includes solvents (XX-1) and reactive diluents (XX-2) and so on.

Specific examples of the solvents (XX-1) includes solvents that were cited in the place of the first reaction and do not have an alcoholic hydroxy group can be cited. Preferable ones thereof include, for instance, solvents such as aromatic hydrocarbons such as toluene and xylene; esters such as ethyl acetate and butyl acetate; ethers such as 1,4-dioxane and tetrahydrofuran; ketones such as methyl ethyl ketone and methyl isobutyl ketone; glycol derivatives such as butyl cellosolve acetate, carbitol acetate, diethylene glycol dimethylether, and propylene glycol monomethylether acetate; alicyclic hydrocarbons such as cyclohexane and cyclohexanol; and petroleum base solvents such as petroleum ether and petroleum naphtha can be cited. These can be used singularly or in combinations of two or more kinds thereof.

The reactive diluents (XX-2), as far as it is a compound that is liquid at normal temperature and that has an ethylenic polymerizing group, is not particularly restricted. For instance, mono-functional (meth)acrylates such as dodecyl (meth)acrylate, 2-ethylhexyl (meth)acrylate, tetrahydrofurfuryl (meth)acrylate, isobornyl (meth)acrylate, adamantyl (meth)acrylate, cyanophenyl (meth)acrylate, 2-hydroxyethyl (meth)acrylate, polyethylene glycol mono(meth)acrylate and carbitol (meth)acrylate; and polyfunctional (meth)acrylates such as diethylene glycol di(meth)acrylate, triethylene glycol di(meth)acrylate, tetraethylene glycol di(meth)acrylate, dipropylene glycol di(meth)acrylate, tripropylene glycol di(meth)acrylate, 1,4-butylene glycol di(meth)acrylate, 1,5-pentanediol di(meth)acrylate, di(meth)acrylate of 5-ethyl(or 5-methyl-)-2-(2-hydroxy-1,1-dimethylethyl)-5-hydroxymethyl-1,3-dioxane, 1,6-hexanediol di(meth)acrylate, neopentyl glycol di(meth)acrylate, 1,6-hexanediolpolyethoxy di(meth)acrylate, neopentyl glycol polypropoxy di(meth)acrylate, trimethylolpropane tri (meth)acrylate, pentaerythritol tri(or tetra) (meth)acrylate, di(meth)acrylate of ε-caprolactone adduct of neopentyl glycol, tri(meth)acrylate of ε-caprolactone adduct of trimethylolpropane, tri- or tetra-(meth)acrylate of ε-caprolactone adduct of pentaerythritol, dipentaerythritol penta- or hexa-(meth)acrylate, poly(meth)acrylate of ε-caprolactone adduct of dipentaerithritol, ditrimethylolpropane tetra(meth)acrylate, tetrabromobisphenol A polyethoxy di(meth)acrylate, bisphenol A polyethoxy di(meth)acrylate, bisphenol-hexafluoropropylpolyethoxy di(meth)acrylate, and hydrogenated bisphenolhexafluoropropylpolyethoxy di(meth)acrylate can be cited. These can be used singularly or in combinations of two or more kinds.

The resin composition 1 may contain, as an arbitrary component, a photo-polymerization initiator (C). As the photo-polymerization initiator (C), all that is described later as the photo-polymerization initiator (C) in a section of a photosensitive resin composition (referred to also as a "resin composition 2") can be used. Preferable example include 2,2-diethoxyacetophenone, 2,2-diethoxy-2-phenylacetophenone, benzophenone, 1-(4-isopropylphenyl)-2-hydroxy-2-methylpropane-1-one, 2-hydroxy-2-methyl-1-phenylpropane-1-one, benzoin ethyl ether, benzoin isobutyl ether, benzoin isopropyl ether, 1-hydroxycyclohexylphenyl ketone, methylbenzoisoformate and 2,4,6-trimethylbenzoyl-diphenylphophine oxide.

The resin composition 1 may contain, other than the photosensitive resin (A) and the diluent (XX) component, in order to appropriately alter the refractive index of a cured product, ethylenic unsaturated group-containing compound (D) other than the (A) and (XX) component. Specific examples of the (D) component, (meth)acrylate oligomers (D-1) include maleimide compounds (D-2), vinyl ether compounds (D-3), N-vinyl compounds (D-4) and polyfunctional (meth)acrylate (D-5) and so on.

The (meth)acrylate oligomer (D-1) includes polyester (meth)acrylate, urethane (meth)acrylate and epoxy (meth)acrylate and so on.

Specific examples of the polyester (meth)acrylate include (meth)acrylates of polyester polyols that are reaction products between polyol components such as (poly)ethylene glycol, (poly)propylene glycol, (poly)tetramethylene glycol, (poly)butylene glycol, neopentyl glycol, 1,6-hexanediol, 3-methyl-1,5-pentanediol, cyclohexane-1,4-dimethanol, bisphenol A polyethoxy diol, hydrogenated bisphenol A and trimethylolpropane and polybasic acids such as maleic acid, succinic acid, fumaric acid, adipic acid, phthalic acid, isophthalic acid, hexahydrophthalic acid, tetrahydrophthalic acid, dimer acid, sebacic acid, azelaic acid and sodium 5-sulfoisophthalate and anhydrides thereof; and polyfunctional polyester (meth)acrylate such as (meth)acrylate of cyclic lactone-modified polyester polyol that is a reaction product between the polyol components and the polybasic acids and anhydrides thereof and ε-caprolactone can be cited.

Specific examples of urethane (meth)acrylate include a reaction product of an organic polyisocyanate compound and a polyol compound and a hydroxy group-containing (meth)acrylate compound and so on.

Specific examples of organic polyisocyanate that is used as a raw material of urethane (meth)acrylate include aromatic diisocyanates such as p-phenylene diisocyanate, m-phenylene diisocyanate, p-xylene diisocyanate, m-xylene diisocyanate, 2,4-tlylene diisocyanate, 2,6-tlylene diisocyanate, 4,4'-diphenylmethane diisocyanate and naphthalene diisocyanate; aliphatic or alicyclic structured diisocyanates such as isophorone diisocyanate, hexamethylene diisocyanate, trimethylhexamethylene diisocyanate, 4,4'-dicyclohexylmethane diisocyanate, hydrogenated xylene diisocyanate, norbornene diisocyanate and lysine diisocyanate; and polyisocyanates such as biuret bodies of one or more kinds of isocyanate monomers or isocyanate bodies obtained by trimerizing the diisocyanate compounds.

Specific examples of polyol compounds that are used as raw materials of the urethane (meth)acrylates include the abovementioned polyol components, polyester polyols, cyclic lactone-modified polyester polyols and so on.

Specific examples of hydroxy group-containing (meth)acrylate compounds that are used as raw materials of the urethane (meth)acrylates include 2-hydroxyethyl (meth)acrylate, 2-hydroxypropyl (meth)acrylate, 2-hydroxybutyl (meth)acrylate, cyclohexane dimethanol mono(meth)acrylate, 4-hydroxybutyl (meth)acrylate, polyethylene glycol mono(meth)acrylate, polypropylene glycol mono(meth)acrylate, pentaerythritol tri(meth)acrylate, and 2-hydroxy-3-phenoxypropyl (meth)acrylate and so on.

As specific examples of the epoxy (meth)acrylate, reaction products obtained by reacting an epoxy resin containing an epoxy group having two or more functionalities and (meth)acrylic acid.

Specific examples of the epoxy resin include bisphenol A diglycidyl ether, hydrogenated bisphenol A diglycidyl ether, bisphenol hexafluoroacetone diglycidyl ether, tetrabromobisphenol A diglycidyl ether, 1,3-bis[1-(2,3-epoxypropoxy)-1-trifluoromethyl-2,2,2-trifluoroethyl]benzene, 1,4-bis[1-(2,3-epoxypropoxy)-1-trifluoromethyl-2,2,2-trifluoroethyl]benzene, 4,4'-bis(2,3-epoxypropoxy)octafluorobiphenyl, spiroglycol diglycidyl ether, polyethylene glycol diglycidyl ether and phenol/novolak epoxy resins without restricting thereto.

Furthermore, these carboxyl group-modified epoxy (meth)acrylates obtained by reacting polybasic acid anhydrides (for instance, succinic anhydride, phthalic anhydride, tetrahydrophthalic anhydride, hexahydrophthalic anhydride, perfluorosuccinic anhydride, perfluorohexahydrophthalic anhydride and so on) to epoxy (meth)acrylates also can be preferably used as the (D-1) component.

Specific examples of maleimide compounds (D-2) include any compounds containing a maleimide group can be used, and 1 to 3 functional maleimide compounds described in JP-A No. 58-40374 and maleimide group-containing urethane oligomers described in JP-A No. 3-12414 can be cited.

As specific examples, maleimide compounds such as N-methylmaleimide, N-ethylmaleimide, N-n-propylmaleimide, N-isopropylmaleimide, N-allylmaleimide, N-n-butylmaleimide, N-2-methyl-propylmaleimide, N-cyclohexyl-maleimide, N-2-ethylhexylmaleimide, N-(2-dimethylaminoethyl)maleimide, N-(1-methoxymethylpropyl)maleimide, N-N'-1,6-hexanebismaleide, bis(3-N-maleimidepropyl) polytetramethylene glycol, bis(2-N-maleimidepropyl) polypropylene glycol, bis(2-N-maleimideethyl) polyethylene glycol, 1,2 (1,3 or 1,4)-bis(N-maleimidemethyl)cyclohexane,

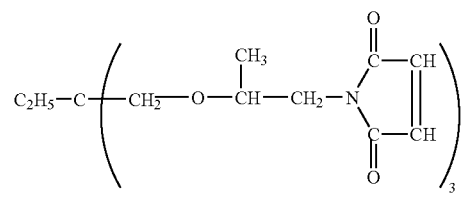

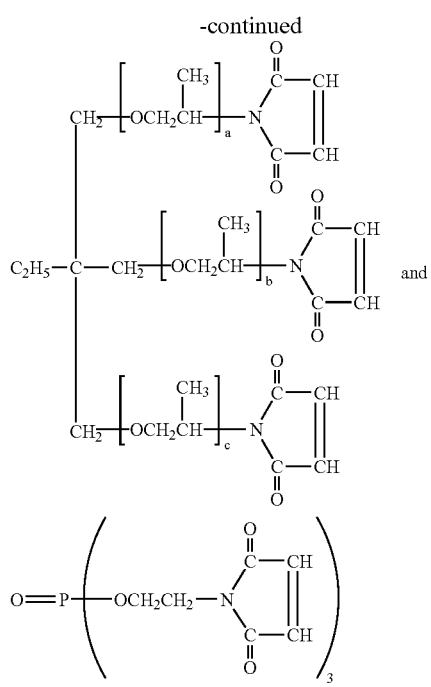

and maleimide compounds obtained by substituting a hydrogen atom bonded to an unsaturated carbon atom in a maleimide group of these maleimide compounds by a chlorine atom, a bromine atom, a methyl group, an ethyl group and a methoxy group can be cited.

Specific examples of vinyl ether compound (D-3), include hydroxymethyl vinyl ether, chloromethyl vinyl ether, hydroxyethyl vinyl ether, 1,4-butanediol divinyl ether, 1,6-hexanediol divinyl ether, 4-hydroxybutyl vinyl ether, trimethylolpropane trivinyl ether, cyclohexanedimethanol mono- or di-vinyl ether, cyclohexane mono- or di-vinyl ether, triethylene glycol divinyl ether, polytetramethylene glycol divinyl ether, polyurethane polyvinyl ether and polyester polyvinyl ether and so on.

Specific examples of the N-vinyl compounds (D-4) include N-vinyl pyrrolidone, N-vinyl caprolactam, N-vinyl formamide and N-vinyl acetamide can be cited.

Specific examples of the polyfunctional (meth)acrylate (D-5) include polyfunctional (meth)acrylates described in the section of the reactive diluent (XX-2), and (meth)acrylates of polyhydric alcohols that have at least one hydroxy group and one acryloyl group and substantially 1 to 20 carbon atoms are preferable.

Preferable ones of these ethylenic unsaturated group-containing compounds (D) include (meth)acrylate oligomers or maleimide compounds and the (meth)acrylate oligomers are preferable, and among these epoxy (meth)acrylates being preferable.

In the resin composition 1, as a ratio of the photosensitive resin (A), the diluent (XX), the photo-polymerization initiator (C) and the (D) component, with respect to 100 parts of the (A) component, the (XX) component is preferably in the range of 10 to 500 parts and particularly preferably in the range of 20 to 200 parts, the (D) component being preferably in the range of 0 to 150 parts and particularly preferably in the range of 30 to 120 parts, the (C) component being, with a total amount of (A)+(XX)+(D) as 100 parts, preferably in the range of 0 to 10 parts, particularly preferably in the range of 0.05 to 6 parts and furthermore preferably in the range of 1 to 3 parts.

In the present invention, as needs arise, a silane coupling agent, a titanium-base coupling agent, a flexibility imparting agent and a characteristics modifier can be added. When these materials are blended singularly or in combinations thereof to a main component, the characteristics of the resin composition can be modified.

For instance, as the silane coupling agents that are added to improve the adhesiveness of the resin compositions of the invention, γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, N-β-(aminoethyl)-β-(aminoethyl)-γ-aminopropylmethyldimethoxysilane, γ-mercaptopropyltrimethoxysilane, γ-mercaptopropyltriethoxysilane, γ-methacryloxypropyltrimethoxysilane, γ-glycidoxypropyltrimethoxysilane, N-β-(N-vinylbenzilaminoethyl)-γ-aminopropyltrimethoxysilane hydrochloride, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl[3-(trimethoxysilyl)propyl]ammonium chloride, γ-chloropropylmethyldimethoxysilane, γ-mercaptopropylmethyldimethoxysilane, methyltrichlorosilane, vinyltriethoxysilane, γ-methacryloxypropyltris(2-methoxyethoxy)silane and β-(3,4-epoxycyclohexyl)ethyltrimethoxysilane can be cited.

The resin composition 1 of the invention can be obtained by blending, dissolving and filtering in a clean room the photosensitive resin (A), the diluent (XX), the photo-polymerization initiator (C) and the ethylenic unsaturated group-containing compound (D), as well as, as needs arise, the coupling agent.

A method of preparing an optical waveguide in the invention is slightly different between a case where an ordinary polymer resin is used for clad and a case where a UV-curable resin similar to a core material is used for clad. An example thereof will be shown below.

(1). On an arbitrary substrate, a resin composition containing a resin with smaller refractive index than a core that becomes a lower clad and a solvent is coated. After the coating, the solvent is removed by means of heating and drying. When a UV-curable resin is used here, UV-light is used to cure.

(2). Thereon, a resin composition of the invention that becomes a core is coated followed by irradiating UV light through a negative mask having an optical waveguide pattern to cure. Thereafter, the sample is developed with a dilute alkali aqueous solution, for instance, an aqueous solution of 3% diethanolamine, and thereby an optical waveguide pattern in which only a UV light irradiated portion is cured in conformity with the mask pattern is prepared.

(3). Thereafter, further thereon, a resin composition containing a polymer resin or a UV-curable resin solution for clad is coated, followed by removing the solvent or irradiating UV-light to cure.

Here, a lower clad as well as a core side-face portion and clad that are formed in the last are desirably same in the refractive index, that is, preferably same in the material. Furthermore, in the case of a UV-curable resin being used for the clad, a surface of the upper-most layer can be flattened. In this case, a multi-layered optical interconnection can be realized. In the case of the multi-layered one being formed, (2) and (3) have only to be repeated.

In the resin composition 1 of the invention, when blending components of the resin are changed, the refractive index can be controlled a little freely to some extent and, furthermore, when the photolithography method is used, an optical waveguide pattern can be conveniently formed; accordingly, the resin composition 1 is suitable for the formation of an optical waveguide and a process of forming the optical waveguide can be simplified. The resin composition for optical waveguide, being excellent in the coating properties in the spin coating and so on and capable of forming a pattern with a dilute alkali aqueous solution, is excellent in the workability. A cured product can be easily formed into a multi-layer. Furthermore, the cured product, being excellent in the light transparency, can prepare an optical waveguide less in the optical transmittance loss. Still furthermore, an obtained optical waveguide is excellent in the heat resistance.

Furthermore, as a preferable resin composition different from the above, a photosensitive resin composition (also referred to as "resin composition 2") containing the photosensitive resin (A), a crosslinking agent (B) and a photo-polymerization initiator (C) can be cited.

A content ratio of the photosensitive resin (A) used in the resin composition 2, with a weight of a solid content of the photosensitive resin composition 100% by weight, is normally 30 to 97% by weight, preferably 40 to 90% by weight and more preferably 50 to 80% by weight.

The resin composition 2 can be obtained by blending, for instance, the photosensitive resin (A) with a photo-polymerization initiator (C) and a crosslinking agent (B) described later or the solvent and the crosslinking agent (B) described later. As the crosslinking agent (B), the crosslinking agents described later can be used singularly or by blending, and an amount thereof used is arbitrary.

The crosslinking agent (B) that can be used in the photosensitive resin composition of the invention, as far as it has two or more reactive groups and the crosslinkability, can be used without particular restriction. Specific examples of the crosslinking agents (B) that can be used include such as 2-hydroxyethyl (meth)acrylate, 2-hydroxypropyl (meth) acrylate, 1,4-butanediol mono(meth)acrylate, carbitol (meth)acrylate, acryloyl morpholine, half esters that are reaction products of (meth)acrylates having a hydroxy group (for instance, 2-hydroxyethyl (meth)acrylate, 2-hydroxypropyl (meth)acrylate, and 1,4-butanediol mono(meth)acrylate) and acid anhydrides (for instance, succinic anhydride, maleic anhydride, phthalic anhydride, tetrahydrophthalic anhydride and hexahydrophthalic anhydride) of polycarboxylic acids, poly(meth)acrylates of polyhydric alcohols having substantially 3 to 20 carbon atoms that may contain an ether bond such as polyethylene glycol di(meth)acrylate, tripropylene glycol di(meth)acrylate, trimethylolpropane tri (meth)acrylate, trimethylolpropanepolyethoxy tri(meth) acrylate or glycerinpolypropoxy tri(meth)acrylate, preferably di- or poly-(meth)acrylates of di- or tri-valent polyhydric alcohols, di(meth)acrylate of ε-caprolactone adduct of an ester of hydroxy pivalate and neopentyl glycol (for instance, KAYARAD HX-220 and HX-620, manufactured by Nippon Kayaku Co., Ltd.), pentaerythritol tetra (meth)acrylate, poly(meth)acrylate of a reaction product of dipentaerythritol and ε-caprolactone, dipentaerythritol poly (meth)acrylate, epoxy(meth)acrylate that is a reaction product of a mono- or poly-glycidyl compound and (meth)acrylic acid (mono- or polyglycidyl compounds that are used as raw material include such as butylglycidyl ether, phenylglycidyl ether, polyethylene glycol diglycidyl ether, polypropylene glycol diglycidyl ether, 1,6-hexanediol diglycidyl ether, hexahydrophthalic diglycidyl ester, glycerin polyglycidyl ether, glycerin polyethoxy glycidyl ether, trimethylolpropane polyglycidyl ether, and trimethylolpropane polyethoxy polyglycidyl ether), and reaction products between diglycols having 6 to 25 carbon atoms including a 4- to 6-membered aliphatic ring that may contain an oxygen atom and (meth) acrylic acid, for instance, reaction products between diglycols such as 3,9-bis(2-hydroxy-1,1-dimethylethyl)-2,4,8,10-tetraoxaspiro[5.5]undecane, 2-(2-hydroxy-1,1-dimethylethyl)-5-ethyl-5-hydroxymethyl-1,3-dioxane, tricyclodecanedimethanol and cyclohexanedimethanol and (meth)acrylic acid. Among these, preferable ones include poly(meth)acrylates of polyhydric alcohols having substantially 3 to 20 carbon atoms that may contain an ether bond, preferably di- or poly-(meth)acrylates of di- or tri-valent polyhydric alcohols, and reaction products between diglycols having 6 to 25 carbon atoms including a 4- to 6-membered aliphatic ring that may contain an oxygen atom and (meth)acrylic acid (for instance, a reaction product between 2-(2-hydroxy-1,1-dimethylethyl)-5-ethyl-5-hydroxymethyl-1,3-dioxane and (meth)acrylic acid[brand name KAYARAD R-604, two-functional acrylate monomer manufactured by Nippon Kayaku Co., Ltd.]. Since an addition ratio of these is not particularly restricted, when a solid content of the photosensitive resin composition is taken as 100% by weight, it may be a balance obtained when blending ratios of the photosensitive resin (A) mentioned above and the photo-polymerization initiator (C) described later are subtracted from 100%. However, it is normally 2 to 50% by weight, preferably 5 to 45% by weight.

The photo-polymerization initiator (C) that is used in the photosensitive resin composition of the invention can be used without particular restriction. For instance, benzoins such as benzoin, benzoin methyl ether, benzoin ethyl ether, benzoin propyl ether, benzoin isopropyl ether and benzoin isobutyl ether; acetophenones such as acetophenone, 2,2-diethoxy-2-phenylacetophenone, 2,2-diethoxy-2-phenylacetophenone, 1,1-dicycloacetophenone, 2-hydroxy-2-methylphenylpropane-1-one, diethoxyacetophenone, 1-hydroxycyclohexylphenyl ketone, 1-(4-isopropylphenyl)-2-hydroxy-2-methylpropane-1-one and 2-methyl-1-[4-(methylthio)phenyl]-2-morpholinopropane-1-one; anthraquinones such as 2-ethylanthraquinone, 2-tert-butylanthraquinone, 2-chloroanthraquinone and 2-amylanthraquinone; thioxanthones such as 2,4-diethyl thioxanthone, 2-isopropylthioxantone and 2-chlorothioxantone; ketals such as acetophenone dimethyl ketal and benzil dimethyl ketal; benzophenones such as benzophenone, 4-benzoyl-4'-methyl diphenyl sulfide and 4,4'-bismethylaminobenzophenone; and phosphine oxides such as 2,4,6-trimethylbenzoyldiphenylphosphine oxide, bis(2,4,6-trimethylbenzoyl)-phenylphosphine oxide, and 2,4,6-trimethylbenzoyldiphenylphosphine oxide can be cited. Methyl benzoisoformate and so on can be cited.

An addition ratio of these is normally 1 to 20% by weight and preferably 2 to 15% by weight based on 100% by weight of a solid content of the photosensitive resin composition.

These can be used singularly or in combinations of two or more kinds, and furthermore can be used together with an accelerator such as tert-amines such as triethanolamine and methyldiethanolamine and benzoic acid derivatives such as ethyl N,N-dimethylaminobenzoate and isoamyl N,N-dimethylamino benzoate. An addition amount of these accelerators is preferably 100% by weight or less relative to the photo-polymerization initiator (C).

The photosensitive resin composition of the invention, other than being useful as optical waveguides that connect between optical components, can be also used as an insulating material between layers of an electronic component, a solder resist for printed circuit boards, a resist material such as cover lay, a color filter, printing ink, a sealant, paint, a coating material and an adhesive.

Cured products of the invention are ones obtained by curing the resin composition of the invention by irradiating radiation such as UV-light. The curing can be carried out according to a standard procedure by irradiating radiation such as UV-light. In the case of, for instance, UV-light being irradiated, UV-light generators such as a low-pressure mercury lamp, a high pressure mercury lamp, a ultrahigh pressure mercury lamp, a xenon lamp and a UV-generating laser (excimer laser and so on) can be used.

The cured product of the invention can be used, for instance, as an optical waveguide and as an interlayer insulator and a resist film for use in build-up technique, in electric/electronic/optical components such as a printed circuit board, a photoelectronic substrate and an optical substrate. As specific example of these, for instance, computers, electric home appliances, and portable devices can be cited. A film thickness of the cured product is in the range of substantially 0.5 to 160 µm and preferably in the range of substantially 1 to 100 µm.

The optical waveguide of the invention can be manufactured, for instance, as follows. That is, in the case of a liquid resin composition being used, on a substrate thereon a clad layer smaller with the refractive index than the photosensitive resin (A) of the invention is applied, by use of a method such as a spin coat method, a screen printing method, a spray method, a roll coat method, an electrostatic coating method and a curtain coat method, the photosensitive resin composition of the invention is coated with a film thickness of 5 to 160 µm and dried in the range of 50 to 110 degree centigrade, preferably in the range of 60 to 100 degree centigrade to form a photosensitive coating. Thereafter, radiation (normally, energy of substantially 10 to 10000 mJ/cm$^2$) such as UV-light is directly or indirectly irradiated through a photomask in which an exposure pattern is formed such as a negative film, followed by developing an unexposed area with a developer described later by means of, for instance, spraying, dipping, brushing and scrubbing. Thereafter, after, as needs arise, UV-light is irradiated, when a surface of the obtained cured product of the invention is further covered with a clad layer, a substrate provided with an optical waveguide excellent in the transparency, the adhesiveness, the solder heat resistance, the chemical resistance and the plating resistance can be obtained.

As specific examples of the developer used in the development, in the case of, for instance, an organic solvent being used, ketones such as acetone, ethyl methyl ketone and cyclohexanone; aromatic hydrocarbons such as benzene, toluene, xylene, and tetramethylbenzene; glycol ethers such as ethylene glycol dimethyl ether, ethylene glycol diethyl ether, dipropylene glycol dimethyl ether, dipropylene glycol diethyl ether, triethylene glycol dimethyl ether and triethylene glycol diethyl ether; esters such as ethyl acetate, butyl acetate, methyl cellosolve acetate, ethyl cellosolve acetate, butyl cellosolve acetate, carbitol acetate, propylene glycol monomethyl ether acetate, propylene glycol monoethyl ether acetate, dipropylene glycol monomethyl ether acetate, dialkyl glutarate, dialkyl succinate and dialkyl adipate; cyclic esters such as γ-butylolactone; petroleum base solvents such as petroleum ether, petroleum naphtha, hydrogenated petroleum naphtha and solvent naphtha; and one or combinations of two or more kinds of organic solvents of alcohols such as methanol, ethanol, propanol and butanol.

Furthermore, specific examples when an alkali aqueous solution is used in the developer include aqueous solutions of inorganic alkalis such as potassium hydroxide, sodium hydroxide, sodium carbonate, potassium carbonate, sodium hydrogen carbonate, potassium hydrogen carbonate, sodium phosphate and potassium phosphate; and aqueous solutions of organic alkalis such as tetramethylammonium hydroxide, tetraethylammonium hydroxide, tetrabutylammonium hydroxide, monoethanolamine, diethanolamine and triethanolamine.

A base material having a cured layer of the resin composition of the invention can be obtained by patterning the cured product on the base material or within the base material by means of a photolithography method. As specific examples of the base material that is used for forming a cured layer, for instance, a glass-epoxy substrate, a glass substrate, a ceramic substrate, a plastic substrate, a silicon substrate, a compound semiconductor substrate and a quartz substrate can be cited.

As specific examples of articles having an optical waveguide of the invention, for instance, a photoelectronic substrate, an optical wiring board and an electronic device that uses these (for instance, a computer and cellular phone) can be cited.

In the next place, the alkali-soluble photosensitive resin (AA) (hereinafter, also simply referred to as resin (AA)) of the invention will be explained.

The resin (AA) can be obtained by further reacting (hereinafter also called as a third reaction) di- or tri-basic acid monoanhydride (e) to the photosensitive resin (A) described first. That is, the resin (AA) can be obtained by further reacting di- or tri-basic acid monoanhydride (e) to the photosensitive resin (A) substantially made of a reaction product between a polyester compound (c) that is a reaction product of a polyol compound (a) and tetra-basic acid dianhydride (b) and a compound (d) that has an ethylenic unsaturated group and an epoxy group in a molecule.

As the di- or tri-basic acid monoanhydride (d) that is used to manufacture the resin (AA), ones having this structure can be used without restriction. However, in order to impart the alkali developability of the composition described later, di- or tri-basic acid monoanhydride of an aliphatic group having 3 to 10 carbon atoms or an aromatic group having 5 to 10 carbon atoms can be cited, and dicarboxylic acid monoanhydride such as tetrahydrophthalic anhydride, hexahydrophthalic anhydride, succinic anhydride and maleic anhydride or tricarboxylic acid monoanhydride such as trimellitic anhydride can be particularly preferably used.

The third reaction is an esterification reaction in which after the second reaction (a reaction between a polyester compound (c) and a compound (d) having an ethylenic unsaturated group and an epoxy group in a molecule) in the manufacture of the photosensitive resin (A) mentioned above came to completion, di- or tri-basic acid monoanhydride (e) (hereinafter, referred to also as monoanhydride (e)) is added to a reaction solution, to react with an alcoholic hydroxy group of the polyester compound (photosensitive resin (A)) that was manufactured according to the second reaction and has an ethylenic unsaturated group and monoanhydride (e). The reaction, since a catalyst is added in the first and second reaction in the manufacture of the photosensitive resin (A) mentioned above, can be carried out without particularly adding a catalyst. An addition amount of the monoanhydride (e) relative to 100 parts by weight of the polyester compound (photosensitive resin (A)) is substantially 5 to 100 parts, preferably substantially 10 to 50 parts. At that time, a reaction temperature is 60 to 130 degree centigrade and a reaction time is preferably 5 to 60 hr.

Thus obtained resin (AA) is an alkali-soluble photosensitive resin and, similarly to the alkali-soluble one of the photosensitive resin (A), can be used as a resin for optical waveguide and a resin for other applications.

In the case of the resin (AA) being used in the above applications, as needs arise, and by adding to the solvent and so on, it can be used as a photosensitive resin composition.

A preferable photosensitive resin composition containing the said resin (AA) includes, one that contains the resin (AA), a crosslinking agent (B) and a photo-polymerization initiator (C) (also referred to as resin composition 3).

The resin composition 3 can be obtained by mixing, for instance, the resin (AA) and the crosslinking agent (B) and the photopolymerization initiator (C) described in the section of the resin composition 2. The crosslinking agents (B) can be used singularly or in combinations thereof and an amount thereof used is arbitrary.

A content ratio of the photosensitive resin (AA) in the resin composition 3 is normally 30 to 97% by weight, preferably 40 to 90% by weight, and more preferably 50 to 80% by weight based on 100% by weight of a total solid content of the resin composition 3.

The crosslinking agent (B) used in the resin composition 3, as far as it has two or more reactive groups and the crosslinkability, can be used without particular restriction. Specific examples of the crosslinking agent include, the crosslinking agents (B) described in the section of the resin composition 2. A content ratio of these in the resin composition 3 is not particularly restricted. The content ratio of the crosslinking agent, when the solid content of the photosensitive resin composition is taken as 100% by weight, may be a balance obtained when content ratios of the photosensitive resin (A) and the photopolymerization initiator (C) described later are subtracted from 100%, is normally 2 to 50% by weight, and preferably 5 to 45% by weight.

The photopolymerization initiator (C) used in the resin composition 3, as far as it has a function as a photopolymerization initiator, is not particularly restricted, and includes the photopolymerization initiators (C) described, for instance, in the section of the resin composition 2. These may be used singularly or in combinations of two or more kinds. A content ratio thereof in the resin composition 3 is normally 1 to 20% by weight and preferably 2 to 15% by weight based on 100% by weight of a total solid content of the resin composition 3.

The resin composition 3 may contain the accelerator described in the section of the resin composition 2 and the accelerator can be used in combination with the photopolymerization initiator (C). An amount of these accelerators used is preferably 0 to 100% by weight relative to the photopolymerization initiator (C).

The resin composition 3 can be used in applications similar to those of the resin composition 2. Furthermore, curing methods of the resin composition 3 and applications of the cured products are also similar to those of the resin composition 2. Still furthermore, also in the manufacture of an optical waveguide that uses the resin composition 3, except that in a case where the resin composition 3 is used the development is restricted to the alkali development, the methods described in the section of the resin composition 2 can be similarly applied.

The manufacture of a base material that has a layer of a cured product of the resin composition 3, the base material that is used for manufacturing the same, and examples of articles having an optical waveguide that uses the resin composition 3 are all the same as that described in the section of the resin composition 2.

EXAMPLES

The present invention will be more specifically explained with reference to examples thereinafter; however, the present invention is not restricted to these examples.

A solid-component acid value in examples complies with JIS K-0070 and is obtained as follows.

Substantially 1 g of a resin solution is dissolved in a mixed solvent of 20 ml of methylethyl ketone and 30 ml of ethanol. In the solution, as an indicator, 2 to 3 drops of an ethanol solution of 1% phenolphthalein are added, thereto a 0.1 mol/L potassium hydroxide solution was gradually dropped, a point where discoloration to pink occurs is taken as a point of neutralization. In that case, an acid value (AV) can be obtained according to the following equation and an acid value of solid content can be calculated by dividing the acid value by a concentration of solid.

$$AV=((B-C) \times f \times 5.611)/S$$

In the equation, meanings of signs are as follows.
AV: acid value (mg·KOH/g)
B: amount of potassium hydroxide solution dropped (ml)
f: factor (adjusting value determined for each of potassium hydroxide titrants used)
S: amount of sample (g)
C: blank (amount of KOH solution necessary for neutralizing the mixed solvent)

Example A1

Synthesis of Photosensitive Resin (A) (Solution of Photosensitive Resin (A-1A))

In a 2L-flask, 411.8 g of propylene glycol monomethyl ether acetate as a reaction solvent, 304.4 g (1,000 mole) of spiro glycol as a polyol compound and 3.09 g of triphenyl phosphine as a reaction catalyst were charged and agitated to disperse, to this dispersed solution 180.2 g (0.909 mole) of BT-100 (manufactured by New Japan Chemical Co., Ltd.) was added as acid anhydride, followed by heating to a temperature of 110 degree centigrade, further followed by causing to react here for 48 hr. After the reaction, it was a clear and homogeneous solution. To the reaction solution, after 133.3 g (0.937 mole) of glycidyl methacrylate and 2.06 g of hydroquinone monomethyl ether as a thermal polymerization inhibitor were added and caused to react at a temperature of 98 degree centigrade for 24 hr, 514.8 g of propylene glycol monomethyl ether acetate was added, thereby a concentration adjustment was carried out so that a solid content concentration (resin/(resin+solvent)) might be 40%, and thereby a solution of resin was obtained. An acid value of the solution of resin was 33 mg-KOH/g (solid acid value was 82.5 mg·KOH/g). The resin solution is referred to as (A-1A).

Example A2

Synthesis of Photosensitive Resin (A) (Solution of Photosensitive Resin (A-2A))

In a 2L-flask, 311.9 g of propylene glycol monomethyl ether acetate as a reaction solvent, 84.2 g (0.429 mole) of tricyclodecane dimethanol and 173.8 g (0.571 mole) of spiro glycol as polyol compounds and 2.67 g of triphenyl phosphine as a reaction catalyst were charged and agitated to disperse. To this dispersion solution, 180.1 g (0.909 mole) of BT-100 (manufactured by New Japan Chemical Co., Ltd.) was added as acid anhydride, followed by heating to a temperature of 110 degree centigrade, further followed by causing to react here for 48 hr. After the reaction, it was a clear and homogeneous solution. To the reaction solution, after 141.1 g (0.992 mole) of glycidyl methacrylate and 1.78 g of hydroquinone monomethyl ether as a thermal polymerization inhibitor were added and caused to react at a temperature of 98 degree centigrade for 24 hr, 556.9 g of propylene glycol monomethyl ether acetate was added, thereby a concentration adjustment was carried out so that a solid content concentration (resin/(resin+solvent)) might be 40%, and thereby a solution of resin was obtained. An acid value of the resin solution was 32 mg·KOH/g (80 mg·KOH/g acid value of solid content). This resin solution is referred to as (A-2A).

Example A3

Preparation of Core-Forming Resin Composition (1a)

175 g of the product (A-2A) obtained in example A2, 30 g of diacrylate of bisphenol A diglycidyl ether and 3 g of 1-hydroxycyclohexylphenyl ketone (photopolymerization initiator) were mixed and filtered through a filter having a mesh diameter of 1 μm, and thereby 208 g of a resin composition (1a) of the invention was obtained. The refractive index of the resin composition (1a) after the curing was 1.526 at a wavelength of 589 nm.

Example A4

Preparation of Clad-Forming Resin Composition (1b)

125 g of the product (A-1A) obtained in example A1, 50 g of 1,6-hexanediol diacrylate and 3 g of 1-hydroxycyclohexylphenyl ketone were mixed and filtered through a filter having a mesh diameter of 1 μm, and thereby 178 g of a resin composition (1b) of the invention was obtained. The refractive index of the resin composition (1b) after the curing was 1.480 at a wavelength of 589 nm.

Example A5

Preparation and Test of Optical Waveguide

On a silicon substrate, the resin composition (1b) obtained in example A4 was coated by means of a spin coat method, and on an entire surface thereof UV-light was irradiated to form a lower clad layer. Subsequently, thereon, the resin composition (1a) obtained in the example A3 was coated with a thickness of 5 μm by means of a spin coat method.

In the next place, UV-light was irradiated through a negative mask having a pattern of waveguide, followed by developing the sample with an aqueous solution of 3% sodium carbonate, and thereby a waveguide pattern that becomes a core layer was formed. Thereafter, on the waveguide pattern and the lower clad layer, the resin composition (1b) mentioned above was coated in a thickness of 15 μm followed by irradiating UV-light to cure, and thereby an optical waveguide with a core side surface portion and a upper clad formed was prepared. According to this operation, a multi-mode channel waveguide having a lower clad layer and a upper clad layer that were made of a cured product of the resin composition (1b) that has the refractive index of 1.483 after the curing and a core made of a cured product of the resin composition (1a) that has the refractive index of 1.511 was prepared.

After the obtained optical waveguide was cut in a length of 5 cm and left in a dryer set at 150 degree centigrade for 24 hr, the optical waveguide loss was investigated with He—Ne laser light of 633 nm and found to be 0.25 dB/cm.

Example B1

Synthesis of Photosensitive Resin (A) (Solution of Photosensitive Resin (A-1B))

In a 2L flask equipped with an agitator and a reflux cooling tube, 304.4 g (1.000 mole) of 3,9-bis(2-hydroxy-1,1-dimethylethyl)-2,4,8,10-tetraoxaspiro[5.5]undecane (brand name: Spiroglycol, manufactured by Japan Hydrazine Co., Inc.) as the diol compound (a'), 167.8 g (0.769 mole) of pyromellitic anhydride (manufactured by Nippon Shokubai Co., Ltd.) as the tetra-basic dianhydride (b) and 296.8 g of propylene glycol monomethyl ether acetate as the reaction solvent were charged and allowed to react at 130 degree centigrade for 4 hr. An acid value of solid content after the reaction was 183 mg·KOH/g. Subsequently, to the reaction solution, 1.70 g of 2,6-di-tert-butyl-p-cresol as the thermal polymerization inhibitor, 79.0 g (0.556 mole) of glycidyl methacrylate (brand name: Blenmer G, manufactured by Nippon Oil & Fats Co., Ltd.), and 2.54 g of triphenyl phosphine as the catalyst were charged, after a homogeneous solution was obtained, the solution was allowed to react at 110 degree centigrade for 8 hr, thereafter in order to adjust the solid content concentration to 50% by weight, further 254.4 g of propylene glycol monomethyl ether acetate was added as a solvent, and thereby a colorless and transparent resin solution containing the photosensitive resin of the invention was obtained. When an acid value of solid content was measured, it was found to be 102 mg·KOH/g. The solution of resin is referred to as (A-1B). The solid-component acid value was measured complying with JIS K0070 (the same also in the following examples)

Example B2

Synthesis of Photosensitive Resin (A) (Solution of Photosensitive Resin (A-2B))

In a 2L flask equipped with an agitator and a reflux cooling tube, 218.3 g (1.000 mole) of 2-(2-hydroxy-1,1-dimethylethyl)-5-ethyl-5-hydroxymethyl-1,3-dioxane as the diol compound (a'), 167.8 g (0.769 mole) of pyromellitic anhydride (manufactured by Nippon Shokubai Co., Ltd.) as the tetra-basic dianhydrice (b) and 386.0 g of propylene glycol monomethyl ether acetate as the reaction solvent were charged and allowed to react at 130 degree centigrade for 4 hr. An acid value of solid content after the reaction was 224 mg·KOH/g. Subsequently, to the reaction solution, 3.63 g of 2,6-di-tert-butyl-p-cresol as the thermal polymerization inhibitor, 218.6 g (1.538 mole) of glycidyl methacrylate (brand name: Blenmer G, manufactured by Nippon Oil & Fats Co., Ltd.), and 3.63 g of triphenyl phosphine as the catalyst were charged, after a homogeneous solution was obtained, the solution was allowed to react at 110 degree centigrade for 8 hr, thereafter in order to adjust the solid content concentration to 50% by weight, 218.6 g of propylene glycol monomethyl ether acetate was added as the solvent, and thereby a colorless and transparent solution of resin containing the photosensitive resin of the invention was obtained. When an acid value of solid content was measured, it was found to be 2 mg·KOH/g. The resin solution is treated as (A-2B).

Example B3

Preparation of Photosensitive Resin Composition (Resin Composition 2) and Formation of Film of Cured Product To 75 g (59.0% by weight to the solid content of the composition) of the solution of resin (A-1B) obtained in example 1, 25 g (39.4% by weight to the solid content of the composition) of trimethylolpropane triacrylate as the crosslinking agent (B), 1 g (1.6% by weight to the solid content of the composition) of benzildimethyl ketal as the photopolymerization initiator (C) and 26 g of propylene glycol monomethyl ether acetate as a concentration adjusting solvent were added. Thereafter, it was filtered with a filter having a mesh diameter of 0.3 µm, and thereby a photosensitive resin composition of the invention was obtained. The photosensitive resin composition was coated on a quartz plate having a thickness of 1 mm by use of a spin coat method, followed by pre-baking for 5 min on a hot plate of which a surface temperature was set at 60 degree centigrade and for 15 min on a hot plate of which a surface temperature was set at 90 degree centigrade, and thereby a coating having a film thickness of 50 µm was obtained. Subsequently, on the coating, UV-light of 5000 mJ/cm$^2$ was irradiated to cure the photosensitive resin composition of the invention, and thereby a quartz plate having a cured film was obtained. When the light transmittance of the film was measured, it was found that the film had the transmittance of 99.5% or more in the range of 500 to 900 nm, that is, it was a cured product very high in the light transmittance.

Furthermore, the same photosensitive resin composition was coated on a glass substrate, followed by the pre-baking under the same conditions, and thereby a coating was obtained. On the coating, a mask on which a waveguide pattern was drawn was brought into close contact, and thereon UV-light of 5000 mJ/cm$^2$ was irradiated. Thereafter, it was dipped in an aqueous solution of 1% tetramethyl ammonium hydroxide for 1 min and thereby an unexposed area was dissolved. After washing with water, UV-light of 5000 mJ/cm$^2$ was post-exposed. Thereafter, when a section of an obtained pattern was observed with an electron microscope, it was a rectangular pattern. Furthermore, after the substrate thereon a pattern was drawn was dipped in a solder bath set at a temperature of 260 degree centigrade for 20 sec, when a section of the obtained pattern was observed with an electron microscope, it was found that little change was caused in shape, that is, the cured product was very high in the heat resistance.

Example B4

Preparation of Photosensitive Resin Composition (Resin Composition 2) and Formation of Film of Cured Product To 75 g (59.0% by weight to the solid content of the composition) of the solution of resin (A-2B) obtained in example B2, 25 g (39.4% by weight to the solid content of the composition) of KAYARAD R-604 (brand name: two-functional acrylate monomer, manufactured by Nippon Kayaku Co., Ltd.) as the crosslinking agent (B), 1 g (1.6% by weight to the solid content of the composition) of 2-hydroxy-2-methyl-phenylpropane-1-one as the photopolymerization initiator (C) and 26 g of propylene glycol monomethyl ether acetate as the concentration adjusting solvent were added. Thereafter, it was filtered with a filter having a mesh diameter of 0.3 µm, and thereby a photosensitive resin composition (resin composition 2) of the invention was obtained. The photosensitive resin composition was coated on a quartz plate having a thickness of 1 mm by use of a spin coat method, followed by pre-baking for 5 min on a hot plate of which a surface temperature was set at 60 degree centigrade and for 15 min on a hot plate of which a surface temperature was set at 90 degree centigrade, and thereby a coating having a film thickness of 50 µm was obtained. Subsequently, on the coating, UV-light of 5000 mJ/cm$^2$ was irradiated to cure the resin composition of the invention, and thereby a quartz plate having a cured film was obtained. When the light transmittance of the film was measured, it was found that the film had the transmittance of 99.5% or more in the range of 450 to 900 nm, that is, it was a cured product very high in the light transmittance.

Furthermore, the same photosensitive resin composition was coated on a glass substrate, followed by the pre-baking under the same conditions, and thereby a coating was obtained. On the coating, a mask on which a waveguide pattern was drawn was brought into close contact, and thereon UV-light of 5000 mJ/cm$^2$ was irradiated. Thereafter, it was dipped in a developer of a mixed organic solvent made of 50% by weight of propylene glycol monomethyl ether acetate and 50% by weight of isopropanol for 1 min, and thereby an unexposed area was dissolved. After applying rinse treatment by dipping in isopropanol, UV-light of 5000 mJ/cm$^2$ was post-exposed. Thereafter, when a section of an obtained pattern was observed with an electron microscope, it was a rectangular pattern. Furthermore, after a substrate thereon a pattern was drawn was dipped in a solder bath set at a temperature of 260 degree centigrade for 20 sec, when a section of an obtained pattern was observed with an electron microscope, it was found that little change was caused in shape, that is, the cured product was very high in the heat resistance.

Example C1

Synthesis of Photosensitive Resin (AA) (Solution of Photosensitive Resin (AA-1C))

In a 2L flask equipped with an agitator and a reflux cooling tube, 463.7 g of propylene glycol monomethyl ether acetate (hereinafter, referred to as PGMEA) as the reaction solvent, 304.4 g (1.000 mole) of 3,9-bis(2-hydroxy-1,1-dimethylethyl)-2,4,8,10-tetraoxaspiro[5.5]undecane (brand name: Spiroglycol, manufactured by Nippon Hydrazine Co., Ltd.) as the diol compound (a') and 167.8 g (0.769 mole) of pyromellitic anhydride (manufactured by Nippon Shokubai Co., Ltd.) as the tetra-basic dianhydrice (b) were charged and allowed to react at 130 degree centigrade for 4 hr. An acid value of the solution after the reaction was 93 mg·KOH/g and it was confirmed that a polyesterification reaction came to completion. Subsequently, to the reaction solution, 3.48 g of 2,6-di-tert-butyl-p-cresol as the thermal polymerization inhibitor and 3.48 g of triphenyl phosphine as the catalyst were charged, after a homogeneous solution was obtained, 223.3 g (1.538 mole) of glycidyl methacrylate (brand name: Blenmer G, manufactured by Nippon Oil & Fats Co., Ltd.) was charged. The solution was heated to 110 degree centigrade and allowed to react there for 8 hr. The acid value of the solution after the reaction was 1 mg·KOH/g and it was confirmed that the reaction almost came to completion. Subsequently, to the reaction solution, 347.6 g of PGMEA and 115.8 g (1.157 mole) of succinic anhydride as the (e) component were charged, followed by reacting at 110 degree centigrade for 4 hr, and thereby a solution of resin containing 50% by weight of the photosensitive resin of the invention was obtained. The solution of resin is referred to as (AA-1C). The acid value of the solution after the reaction was 45 mg·KOH/g (corresponding to 90 mg·KOH/g acid value of solid content) and it was confirmed that the reaction came to almost completion. The solid acid value was measured of JIS K 0070 (the same also in the following examples).

Example C2

Synthesis of Photosensitive Resin (AA) (Solution of Photosensitive Resin (AA-2C))

In a 2L flask equipped with an agitator and a reflux cooling tube, 316.3 g of PGMEA as the reaction solvent, 196.3 g (1.000 mole) of tricyclodecane dimethanol as the diol compound (a') and 167.8 g (0.769 mole) of pyromellitic anhydride (manufactured by Nippon Shokubai Co., Ltd.) as the tetra-basic dianhydrice (b) were charged and allowed to react at 130 degree centigrade for 4 hr. An acid value of the solution after the reaction was 127 mg·KOH/g and it was confirmed that the polyesterification reaction came to completion. To the reaction solution, after 2.71 g of 2,6-di-tert-butyl-p-cresol as the thermal polymerization inhibitor and 2.71 g of triphenyl phosphine as the catalyst were charged and a homogeneous solution was obtained, 223.3 g (1.538 mole) of glycidyl methacrylate (brand name: Blenmer G, manufactured by Nippon Oil & Fats Co., Ltd.) was charged. The solution was heated to 110 degree centigrade and allowed to react there for 8 hr. The acid value of the solution after the reaction was 1 mg·KOH/g and it was confirmed that the reaction almost came to completion. Subsequently, to the reaction solution, 368.9 g of PGMEA and 97.8 g (0.977 mole) of succinic anhydride as the (d) component were charged, followed by reacting at 110 degree centigrade for 4 hr, and thereby a solution of resin containing 50% by weight of the photosensitive resin of the invention was obtained. The solution of resin is treated to as (AA-2C). The acid value of the solution after the reaction was 42 mg·KOH/g (corresponding to 84 mg·KOH/g of solid acid value) and it was confirmed that the reaction came to almost completion.

Example C3

Synthesis of Photosensitive Resin (AA) (Solution of Photosensitive Resin (AA-3C))

In a 2L flask equipped with an agitator and a reflux cooling tube, 406.3 g of PGMEA as the reaction solvent, 218.3 g (1.000 mole) of 2-(2-hydroxy-1,1-dimethylethyl)-5-ethyl-5-hydroxymethyl-1,3-dioxane as the diol compound (a') and 167.8 g (0.769 mole) of pyromellitic anhydride (manufactured by Nippon Shokubai Co., Ltd.) as the tetra-basic dianhydride (b) were charged and allowed to react at 130 degree centigrade for 4 hr. An acid value of the solution after the reaction was 109 mg·KOH/g and it was confirmed that the polyesterification reaction came to completion. To the reaction solution, 3.05 g of 2,6-di-tert-butyl-p-cresol as the thermal polymerization inhibitor and 3.05 g of triphenyl phosphine as the catalyst were charged, and after a homogeneous solution was obtained, 223.3 g (1.538 mole) of glycidyl methacrylate (brand name: Blenmer G, manufactured by Nippon Oil & Fats Co., Ltd.) was charged. The solution was heated to 110 degree centigrade and allowed to react there for 8 hr. An acid value of the solution after the reaction was 2 mg·KOH/g and it was confirmed that the reaction came to almost completion. Subsequently, to the reaction solution, 430.0 g of PGMEA and 226.7 g (1.490 mole) of tetrahydrophthalic anhydride as the (e) component were charged and allowed to react at 110 degree centigrade for 4 hr, and thereby a solution of resin containing 50% by weight of the photosensitive resin of the invention was obtained. The solution of resin is referred to as (AA-3C). An acid value of the solution after the reaction was 52 mg·KOH/g (corresponding to 104 mg·KOH/g acid value of solid content) and it was confirmed that the reaction came to almost completion.

Example C4

Synthesis of Photosensitive Resin (AA) (Solution of Photosensitive Resin (AA-4C))

In a 2L flask equipped with an agitator and a reflux cooling tube, 429.5 g of PGMEA as the reaction solvent, 129.8 g (0.595 mole) of 2-(2-hydroxy-1,1-dimethylethyl)-5-ethyl-5-hydroxymethyl-1,3-dioxane and 123.4 g (0.405 mole) of 3,9-bis(2-hydroxy-1,1-dimethylethyl)-2,4,8,10-tetraoxaspiro[5.5]undecane as the diol compound (a') and 167.8 g (0.769 mole) of pyromellitic anhydride (manufactured by Nippon Shokubai Co., Ltd.) as the tetra-basic dianhydride (b) were charged and allowed to react at 130 degree centigrade for 4 hr. An acid value of the solution after the reaction was 101 mg·KOH/g and it was confirmed that the polyesterification reaction came to completion. To the reaction solution, 3.22 g of 2,6-di-tert-butyl-p-cresol as the thermal polymerization inhibitor and 3.22 g of triphenyl phosphine as the catalyst were charged, and after a homogeneous solution was obtained, 223.3 g (1.538 mole) of glycidyl methacrylate (brand name: Blenmer G, manufactured by Nippon Oil & Fats Co., Ltd.) was charged. The solution was heated to 110 degree centigrade and allowed to react there for 8 hr. An acid value of the solution after the reaction was 2 mg·KOH/g and it was confirmed that the reaction came to almost completion. Subsequently, to the reaction solution, 393.3 g of PGMEA and 178.5 g (1.173 mole) of tetrahydrophthalic anhydride as the (e) component were charged and allowed to react at 110 degree centigrade for 4 hr, and thereby a solution of resin containing 50% by weight of the photosensitive resin of the invention was obtained. The solution of resin is treated as (AA-4C). An acid value of the solution after the reaction was 41 mg·KOH/g (corresponding to 82 mg·KOH/g acid value of solid content) and it was confirmed that the reaction came to almost completion.

Example C5

Preparation of Photosensitive Resin Composition (Resin Composition 3) and Formation of Cured Film and Waveguide Pattern To 75 g (59.0% by weight to the solid content of the composition) of the solution of resin (AA-1C) obtained in example C1, 25 g (39.4% by weight to the solid content of the composition) of KAYARAD R-604 (brand name: two-functional acrylate monomer, manufactured by Nippon Kayaku Co., Ltd.) as the crosslinking agent (B), 1 g (1.6% by weight to the solid content of the composition) of 2-hydroxy-2-methyl-phenylpropane-1-one as the photopolymerization initiator (C) and 26 g of propylene glycol monomethyl ether acetate as the concentration adjusting solvent were added. Thereafter, it was filtered with a filter having a pore size of 0.3 μm, and thereby a photosensitive resin composition (resin composition 3) of the invention was obtained. The photosensitive resin composition was coated on a quartz plate having a thickness of 1 mm by a spin coat method, followed by pre-baking for 5 min on a hot plate of which a surface temperature was set at 60 degree centigrade and for 15 min on a hot plate of which a surface temperature was set at 90 degree centigrade, and thereby a coating having a film thickness of 50 μm was obtained.

Subsequently, on the coating, UV-light of 5000 mJ/cm$^2$ was irradiated to cure the photosensitive resin composition of the invention, and thereby a quartz plate having a cured film was obtained. When the light transmittance of the film was measured, it was found that the film had the transmittance of 99.5% or more in the range of 450 to 900 nm, that is, it was a cured product very high in the light transmittance. Furthermore, the same photosensitive resin composition was coated on a glass substrate, followed by pre-baking under the same conditions, and thereby a coating was obtained. On the coating, a mask on which a waveguide pattern was drawn was brought into close contact, and thereon UV-light of 5000 mJ/cm$^2$ was irradiated. Thereafter, it was dipped in an aqueous solution of 1.5% by weight of tetramethylammonium hydroxide for 1 min, and thereby an unexposed area was dissolved. After washing with water, UV-light of 5000 mJ/cm$^2$ was post-exposed. When a section of an obtained pattern was observed with an electron microscope, a rectangular pattern was resolved. Furthermore, after a substrate thereon a pattern was drawn was dipped in a solder bath set at a temperature of 260 degree centigrade for 20 sec, when a section of an obtained pattern was observed with an electron microscope, it was found that little change was caused in shape, that is, the cured product was very high in the heat resistance.

Example C6

Preparation of Photosensitive Resin Composition (Resin Composition 3) and Formation of Optical Waveguide To 75 g (59.0% by weight to the solid content of the composition) of the solution of resin (AA-2C) obtained in example C2, 25 g (39.4% by weight to the solid content of the composition) of KAYARAD R-684 (brand name: two-functional acrylate monomer, manufactured by Nippon Kayaku Co., Ltd.) as the crosslinking agent (B), 1 g (1.6% by weight to the solid content of the composition) of 2-hydroxy-2-methyl-phenylpropane-1-one as the photopolymerization initiator (C) and 26 g of propylene glycol monomethyl ether acetate as the concentration adjusting solvent were added. Thereafter, it was filtered with a filter having a pore size of 0.3 μm, and thereby a photosensitive resin composition (resin composition 3) of the invention was obtained. The refractive index of the solid content of the photosensitive resin composition was 1.52.

The photosensitive resin was coated on a substrate having a clad layer of which the main component was an epoxy resin and the refractive index was 1.47 by means of a spin coat method, followed pre-baking for 5 mm on a hot plate of which a surface temperature was set at 60 degree centigrade and for 15 min on a hot plate of which a surface temperature was set at 90 degree centigrade, and thereby a coating having a film thickness of 50 μm was obtained. On the coating, a mask on which a waveguide pattern was drawn was brought into close contact, and thereon UV-light of 5000 mJ/cm$^2$ was irradiated. Thereafter, it was dipped in an aqueous solution of 1.5% by weight of tetramethylammonium hydroxide for 1 min, and thereby an unexposed portion was dissolved. After washing with water and drying, UV-light of 5000 mJ/cm$^2$ was post-exposed. Subsequently, on the obtained pattern, a solution of resin of which the main component is an epoxy resin and the refractive index is 1.47 was coated on all surfaces, followed by curing at 150 degree centigrade for 2 hr, and thereby an optical waveguide provided with an overclad layer was prepared. The optical transmission loss of the obtained waveguide was 0.2 dB/cm (650 nm), that is, it was found to be practically applicable level as a waveguide. The refractive index was measured with Abbe refractometer.

Examples C7, C8

With the solutions of resin obtained in examples C3 and C4, according to a procedure similar to example C6, photosensitive resin compositions (resin composition 3) of the invention were prepared, and therewith, according to a procedure similar to example C6, waveguides were prepared. The optical transmittance loss of the waveguide obtained from the solution of resin (AA-3C) was 0.15 dB/cm (650 nm) and it was a practically applicable level as a waveguide. Furthermore, the optical transmission loss of the waveguide obtained from the solution of resin (AA-4C) was 0.10 dB/cm (650 nm) and it was a practically applicable level as a waveguide.

INDUSTRIAL APPLICABILITY

As explained above, the photosensitive resins (A) and (AA) of the invention, a resin composition is formed therefrom can form cured products excellent in the transparency, the adhesiveness, the solder heat resistance, the chemicals resistance and the plating resistance by appropriately blending, as needs arise, a diluent (XX), a crosslinking agent (B) and a photopolymerization initiator (C) thereto and preparing a resin composition. Furthermore, the resin composition, being excellent in the coating properties in the spin coat and so on, by use of a photolithographically method, allows easily forming an optical waveguide pattern, can be easily flattened, furthermore, by changing a blending ratio of the composition, can vary the refractive index. Thus, since many advantages can be realized as mentioned above, the resin and resin composition of the invention can be widely applied as a formation material of an optical waveguide pattern, and a cured product of the resin composition is particularly useful as a core and a clad of an optical waveguide.

The invention claimed is:

1. A photosensitive resin composition comprising a photosensitive resin (A) comprising a carboxyl group-containing (meth)acrylate oligomer (A') which is a reaction product between a carboxyl group-containing polyester compound (c') and a compound (d') that has a (meth)acryloyl group and an epoxy group in a molecule, wherein said compound (d') is glycidyl (meth)acrylate, and wherein the polyester compound (c') is a reaction product between a diol compound (a') having an alicyclic structure and tetra-basic acid dianhydride (b), a photopolymerization initiator (C) and a diluent (XX) or a crosslinking agent (B).

2. The photosensitive resin composition according to claim 1, wherein the resin composition is a resin composition for use in an optical waveguide.

3. The photosensitive resin composition according to any one of claims 1 or 2, further comprising an ethylenic unsaturated group-containing compound (D) other than the photosensitive resin (A).

4. A cured product of the resin composition according to any one of claims 1 or 2.

5. The photosensitive resin composition according to claim 1, comprising the carboxyl group-containing (meth) acrylate oligomer (A'), a crosslinking agent (B) and a photopolymerization initiator (C).

6. The photosensitive resin composition according to claim 5, wherein the crosslinking agent (B) is between poly(meth)acrylate of polyhydric alcohol that has substantially 3 to 20 carbon atoms and may contain an ether bond or a reaction product between a diglycol that has 6 to 25 carbon atoms and contains a 4- to 6-membered aliphatic ring that may contain an oxygen atom and (meth)acrylic acid.

7. The photosensitive resin composition according to claim 6, wherein the reaction product is a reaction product between 2-(2-hydroxy-1,1-dimethylethyl)-5-ethyl-5-hydroxymethyl-1,3-dioxane and acrylic acid.

8. A cured product of the photosensitive resin composition according to any one of claims 5 through 7.

9. A base material, comprising a layer of the cured product according to claim 8.

10. An article, comprising the base material according to claim 9.

11. An optical waveguide, comprising a layer of the cured product according to claim 8.

12. The photosensitive resin composition according to claim 1, wherein the diol compound (a') is a diol compound selected from the group consisting of 3,9-bis(2-hydroxy-1,1-dimethyletyl)-2,4,8,10-tetraoxaspiro[5.5]undecane, 2-(2-hydroxy-1,1-dimethylethyl)-5-ethyl-5-hydroxymethyl-1,3-dioxane, tricyclodecane- dimethanol and cyclohexanedimethanol.

13. The photosensitive resin composition according to claim 1, wherein the tetra-basic acid dianhydride (b) is a tetrabasic acid dianhydride selected from a group consisting of pyromellitic anhydride, ethylene glycol-bis(anhydrotrimellitate), glycerin-bis(anhydrotrimellitate)monoacetate, 1,2,3,4,-butanetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, 3,3',4,4'-diphenylethertetracarboxylic dianhydride, 2,2-bis(3,4-anhydrodicarboxyphenyl)propane, 2,2-bis(3,4-anhydrodicarboxyphenyl)hexafluoropropane, 5-(2,5-dioxotetrahydro-3-furanyl)-3-methylcyclohexene-1,2-dicarboxylic anhydride and 3a,4,5,9b-tetrahydro-5-(tetrahydro-2,5-dioxo-3-furanyl)-naphtho[1,2-c]furan-1,3-dione.

14. The photosensitive resin composition according to claim 1, wherein the diol compound (a') is a diol compound selected from a group consisting of 3,9-bis(2-hydroxy-1,1-dimethylethyl)-2,4,8,10-tetraoxaspiro[5.5]undecane, 2-(2-hydroxyl-1,1-dimethyethyl)-5-ethyl-5-hydroxymethyl-1,3-dioxane, tricyclodecanedimethanol and cyclohexanedimethanol, the tetrabasic acid dianhydride (b) is pyromellitic anhydride, and the (d) component is glycidyl (meth)acrylate.

15. The photosensitive resin composition according to claim 1, wherein an acid value of a solid content contained in the photosensitive resin (A) is 120 mg·KOH/g or less.

16. An alkali-soluble and photosensitive resin (AA), comprising a reaction product obtained by allowing further reacting di-basic acid or tri-basic acid monoanhydride (e) to a photosensitive resin (A) comprising a reaction product between a polyester compound (c) that is a reaction product between a polyol compound (a) and tetra-basic acid dianhydride (b) and a compound (d) having an ethylenic unsaturated group and an epoxy group in a molecule.

17. The resin (AA) according to claim 16, comprising a reaction product between an ethylenic unsaturated group-containing polyester compound that is obtained from a polyester compound (c) and a compound (d) having an ethylenic unsaturated group and an epoxy group in a molecule, wherein said compound (c) is obtained from a diol compound (a') and tetra-basic acid dianhydride (b) and di- or tri-basic acid monoanhydride (e).

18. The resin (AA) according to claim 17, wherein the compound (d) having an ethylenic unsaturated group and an epoxy group in a molecule is glycidyl (meth) acrylate.

19. The resin (AA) according to claim 17, wherein the di- or tri-basic acid monoanhydride (e) is di- or tri-carboxylic monoanhydride.

20. The resin (AA) according to claim 17, wherein the di- or tri-basic acid monoanhydride (e) is di- or tri-basic acid monoanhydride selected from tetrahydrophthalic anhydride, hexahydrophthalic anhydride, succinic anhydride, maleic anhydride and trimellitic anhydride.

21. The resin (AA) according to claim 17, wherein an acid value of a solid content contained in the resin (AA) is in the range of 50 to 150 mg·KOH/g.

22. A photosensitive resin composition, comprising the resin (AA) according to claim 17, a crosslinking agent (B) and a photo-polymerization initiator (C).

23. A cured product of the photosensitive resin composition according to claim 22.

24. A base material, comprising a layer of the cured product according to claim 23.

25. An optical waveguide, comprising a layer of the cured product according to claim 23.

26. An article, comprising the base material according to claim 24 or the optical waveguide according to claim 25.

27. The resin (AA) according to claim 17, wherein the diol compound (a') is a compound that has an alicyclic skeleton.

28. The resin (AA) according to claim 17, wherein the diol compound (a') is a diol compound selected from a group consisting of 3,9-bis(2-hydroxy-1,1-dimethylethyl)-2,4,8,10-tetraoxaspiro[5.5]undecane, 2-(2-hydroxy-1,1-dimethylethyl)-5-ethyl-5-hydroxymethyl-1,3-dioxane, tricyclodecanedimethanol and cyclohexanedimethanol.

29. The resin (AA) according to any one of claims 17 through 28, wherein the tetra-basic acid dianhydride (b) is a tetra-basic acid dianhydride selected from a group consisting of pyromellitic anhydride, ethylene glycol-bis(anhydrotrimellitate), glycerin-bis(anhydrotrimellitate)monoacetate, 1,2,3,4,-butanetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, 3,3',4,4'-diphenylethertetracarboxylic dianhydride, 2,2-bis(3,4-anhydrodicarboxyphenyl)propane, 2,2-bis(3,4-anhydrodicarboxyphenyl)hexafluoropropane, 5-(2,5-dioxotetrahydro-3-furanyl)-3-methylcyclohexene-1,2-dicarboxylic anhydride and 3a,4,5,9b-tetrahydro-5-(tetrahydro-2,5-dioxo-3-furanyl)-naphtho[1,2-c]furan-1,3-dione.

* * * * *